United States Patent
Balci et al.

(10) Patent No.: US 7,774,184 B2
(45) Date of Patent: Aug. 10, 2010

(54) BROWNFIELD WORKFLOW AND PRODUCTION FORECAST TOOL

(75) Inventors: Bulent Balci, London (GB); Omer M. Gurpinar, Denver, CO (US); Ruben Saier, Houston, TX (US); Murli Challappa, Sugar Land, TX (US); Iain Christopher Morrish, Calgary (CA); Blaine Allen Hollinger, Calgary (CA); Georg Zangl, Laxenburg (AT)

(73) Assignee: Schlumberger Technology Corporation, Sugarland, TX (US)

( * ) Notice: Subject to any disclaimer, the term of this patent is extended or adjusted under 35 U.S.C. 154(b) by 762 days.

(21) Appl. No.: 11/675,074

(22) Filed: Feb. 14, 2007

(65) Prior Publication Data

US 2008/0091283 A1 Apr. 17, 2008

Related U.S. Application Data

(60) Provisional application No. 60/852,503, filed on Oct. 17, 2006.

(51) Int. Cl.
*G06G 7/48* (2006.01)
(52) U.S. Cl. ............... 703/10; 703/2; 703/22; 702/13; 705/7; 405/128.7
(58) Field of Classification Search .......... 703/2, 703/6, 10, 22; 702/6, 11–13; 700/90; 705/7, 705/10; 405/128.1, 128.7
See application file for complete search history.

(56) References Cited

U.S. PATENT DOCUMENTS 6,139,221 A * 10/2000 Ankeny et al. ............. 405/52
2003/0010266 A1 * 1/2003 Ballantine et al. .......... 110/229
2003/0097272 A1 * 5/2003 Ellison et al. ............... 705/1
2003/0110065 A1 * 6/2003 Twigge-Molecey .......... 705/7
2005/0055233 A1 * 3/2005 Wenzlau et al. ............. 705/1

OTHER PUBLICATIONS

Sood et al., S. Power Generation at Brownfields, IEEE, Power Engineering Society, Jun. 2004, pp. 849-854.*
Kocoaglu et al., D. Technology Selection in Brownfields Redevelopment, IEEE, Portland Int. Conference on Management of Engineering and Technology, Jul.-Aug. 2001, pp. 650-658.*
Saberiyan et al., A.G. Technology Selection in Brownfields Redevelopment, IEEE, Portland Int. Conference on Management of Engineering and Technology, Jul.-Aug. 2001, p. 495.*
Pipan et al., M. Integrated Vertical Radar Profiles (VRP) and Multi-Fold GPR for Site Characterization, IEEE, 2nd International Workshop on Advanced GPR, May 2003, pp. 125-129.*

(Continued)

*Primary Examiner*—Russell Frejd
(74) *Attorney, Agent, or Firm*—Jenkins & Gilchrist; Rich Ruble

(57) ABSTRACT

Computer-based method and system are disclosed for conduction a brownfield assessment. The system/method involves a workflow manager that standardizes the tasks needed to be performed during the brownfield assessment and streamlines the completion of these tasks. The workflow manager incorporates expert knowledge and best practices identified over time for previous brownfield assessments. The expert knowledge and best practices are then applied automatically through operation of the workflow manager. Such an arrangement can result in significantly reduced completion time as well as more consistent deliverables from engineer to engineer and project to project.

21 Claims, 21 Drawing Sheets

OTHER PUBLICATIONS

Wongnapapisan, B. et al., "Optimising Brown Field Redevelopment Options Using A Decision Risk Assessment: Case Study—Bokor Field, Malaysia," SPE International, SPE Asia Pacific Conference on integrated Modelling for Asset Management, Mar. 29-30, 2004, pp. 1-13, SPE 87047, Kuala Lumpur, Malaysia.

* cited by examiner

BROWNFIELD WORKFLOW AND PRODUCTION FORECAST TOOL

CROSS-REFERENCE TO RELATED APPLICATIONS

This application for patent claims priority to, and hereby incorporates by reference, U.S. Provisional Application Ser. No. 60/852,503, entitled "Method, Apparatus and System for Delivering and Executing Best Practices in Oilfield Development Projects," filed Oct. 17, 2006, with the United States Patent and Trademark Office.

TECHNICAL FIELD

The present invention relates generally to assessment of brownfields and, more particularly, to a method and system for more efficiently and consistently conducting such assessments.

BACKGROUND

The term "brownfield" is used in the oil and gas industry to refer to an existing oil or gas accumulation that has reached a production plateau or even progressed to a stage of declining production. Oil and gas companies seek to extend the economic producing life of these fields through development, rehabilitation and optimization of production (hereinafter "redevelopment"). Brownfield redevelopment projects are particularly important if the industry is to continue to meet worldwide demand for cost-effective energy in the face of declining resources. Some industry experts predict that brownfields will be relied on to produce more than 50 percent of the world's oil and gas by the year 2012.

Brownfield redevelopment projects, however, are high-risk, long-term, projects. Accordingly, engineering and oilfield services companies participating in these brownfield redevelopment projects are typically compensated based on incremental production increases or on one or more key performance indicators (KPI). Therefore, full integration of subsurface engineering, production technology, well engineering and production infrastructure engineering that enables robust front-end engineering and frontloaded negotiation are of the utmost importance in order to manage the high risks involved.

Because of the high risks, brownfield redevelopment projects must be thoroughly assessed beforehand to determine economic viability prior to committing resources or making investments. A brownfield assessment helps identify, among other things, production enhancement opportunities, infill drilling, injection, workover and reactivation candidates and potentially new strategies for redevelopment of the field. The assessment is typically modeled after a traditional decision & risk analysis, including project framing, data collection, data analysis, and results interpretation & decision rendering. Usually, a number of studies must be conducted, including extensive geological & geophysical (G & G) studies, reservoir & production engineering studies, static & dynamic modeling, and other similar studies performed by multidisciplinary teams.

However, assessment of a brownfield can take 4-18 months or longer to complete. In contrast, a data room exercise for determining whether to invest in the brownfield project must typically be carried out in a matter of weeks. Several challenges contribute to the lengthy completion time, including an enormous amount of data to be analyzed, a lack of certain kinds of data, uncertainties regarding data quality, insufficient time to conduct sufficiently detailed studies, and the like.

Moreover, while a tremendous amount of expert knowledge and best practices have been developed over time by the individual engineers and other personnel who perform brownfield assessments, existing procedures do not provide a way to capture and systematically enforce the use of this knowledge and best practices. Consequently the quality and reliability of the assessment deliverables may vary from engineering team to engineering team and even engineer to engineer.

Accordingly, what is needed is a way to conduct brownfield assessments in a more timely, efficient, and consistent manner. In addition, what is needed is a way to systematically capture and enforce the use of expert knowledge and best practices in such brownfield assessments.

SUMMARY

The present invention is directed to a computer-based method and system for conducting a brownfield assessment. The system/method of the invention involves a workflow manager that standardizes the tasks needed to be performed during the brownfield assessment and streamlines the completion of these tasks. The workflow manager incorporates expert knowledge and best practices identified over time for previous brownfield assessments. The expert knowledge and best practices are then applied automatically through operation of the workflow manager. Such an arrangement can result in significantly reduced completion time as well as more consistent deliverables from engineer to engineer and project to project.

In general, in one aspect, the invention is directed to a computer-based method for conducting a technical assessment phase of a brownfield assessment plan. The method comprises determining an optimal set of engineering tasks to be performed in the technical assessment phase and an optimal order for performing the optimal set of engineering tasks in the technical assessment phase. The method further comprises enforcing performance of the optimal set of engineering tasks in the optimal order for subsequent technical assessment phases of subsequent brownfield assessment plans. The optimal set of engineering tasks and the optimal order are determined based on expert knowledge and best practices identified from performance of previous brownfield assessment plans.

In general, in another aspect, the invention is directed to a computer-based system for conducting a technical assessment phase of a brownfield assessment plan. The system comprises a processor, a system bus connected to the processor, and a storage medium connected to the system bus. The storage medium has computer-readable instructions stored thereon for causing the processor to define an optimal set of engineering tasks to be performed in the technical assessment phase and an optimal order for performing the optimal set of engineering tasks in the technical assessment phase. The computer-readable instructions further cause the processor to enforce performance of the optimal set of engineering tasks in the optimal order for subsequent technical assessment phases of subsequent brownfield assessment plans, which optimal set of engineering tasks and optimal order are determined based on expert knowledge and best practices identified from performance of previous brownfield assessment plans.

In general, in yet another aspect, the invention is directed to a method of conducting a brownfield assessment in a consistent, efficient, and timely manner. The method comprises collecting data for the brownfield assessment and performing an analysis of the data, the analysis including a cost assessment phase and a technical assessment phase, the technical assessment phase performed using expert knowledge and best practices identified from previous brownfield assessments. The method further comprises automatically enforcing use of the expert knowledge and the best practices during the technical assessment phase and interpreting a result of the technical assessment phase and the cost assessment phase.

BRIEF DESCRIPTION OF THE DRAWINGS

The foregoing and other advantages of the invention will become apparent from the following detailed description and upon reference to the drawings, wherein:

FIGS. 4a-4f illustrate exemplary user interview screens of the workflow manager according to embodiments of the invention;

FIG. 7 illustrates an exemplary petrophysics screen of the workflow manager according to embodiments of the invention;

FIG. 9 illustrates an exemplary outlier identification screen of the workflow manager according to embodiments of the invention;

FIG. 10 illustrates an exemplary results screen of the workflow manager according to embodiments of the invention;

FIGS. 13a-13b illustrate exemplary economics screens of the workflow manager according to embodiments of the invention.

DETAILED DESCRIPTION

As mentioned above, existing brownfield assessments can take 4-18 months or longer to complete and fail to capture and enforce expert knowledge and best practices. Embodiments of the invention provide a system and method for significantly reducing the amount of time required to complete a brownfield assessment while ensuring the use of expert knowledge and best practices. The system/method of the invention involves a workflow manager that helps standardize and streamline various tasks that need to be performed during the brownfield assessment. Such a workflow manager can result in significantly reduced completion time as well as more consistent deliverables from engineer to engineer and project to project.

In addition, the workflow manager incorporates expert knowledge and best practices. Such expert knowledge and best practices include, for example, performing certain steps in a certain sequence, or applying knowledge obtained in one business and/or product line and/or geographical location to other businesses and/or product lines and/or geographical locations, and so forth. Then, whenever the workflow manager is used, the expert knowledge and best practices captured therein are automatically applied. The result is a brownfield assessment that systematically benefits from various expert knowledge and best practices that have been developed over time.

Figure 1:
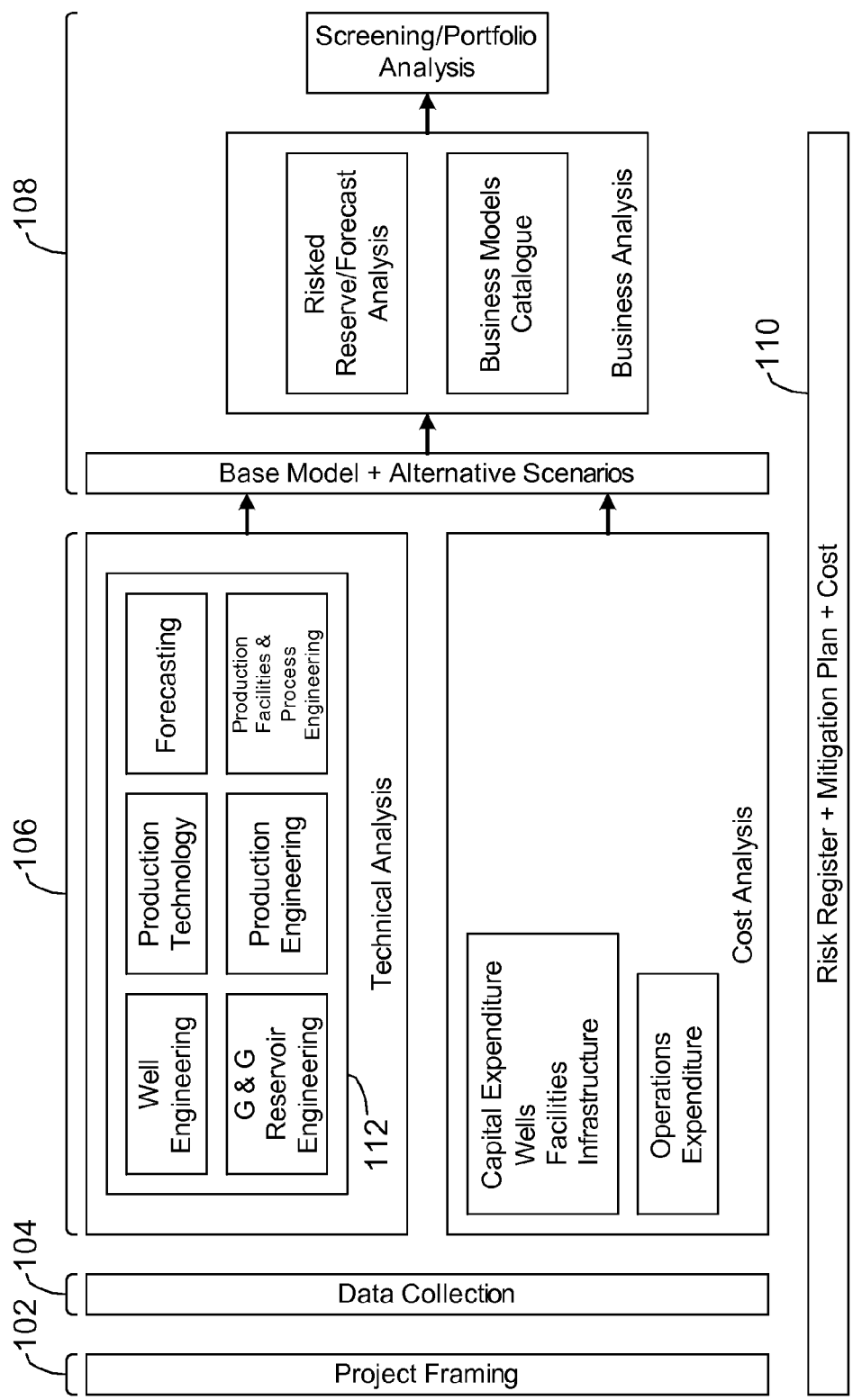
FIG. 1 illustrates an exemplary brownfield assessment plan in which a workflow manager according to embodiments of the invention may be used.

Referring now to FIG. 1, a brownfield assessment plan 100 according to embodiments of the invention is shown, where time progresses from left to right. As can be seen, the brownfield assessment plan 100 resembles a traditional decision & risk analysis in that it includes the steps of project framing 102, data collection 104, data analysis 106, and results interpretation & decision rendering 108. Although several individual steps are shown, each step may be divided into one or more sub-steps or combined with other steps to form a super-step as needed. For ease of reference, both a sub-step and a super-step will be referred to simply as a "step" herein.

The project framing step 102 and data collection step 104 are generally well known to those having ordinary skill in the art and will not be described here. The data analysis step 106, including a technical assessment phase and a cost assessment phase, is performed based on the data collected during the data collection step 104. The results of the data analysis step 106 are then used in the results interpretation & decision rendering step 108, including a base model and alternative scenarios generation phase, a business analysis phase, and a screening/portfolio analysis phase. Finally, risks are identified, mitigation plans developed, and costs are considered throughout the course of the brownfield assessment, as indicated generally at 110.

In accordance with embodiments of the invention, a workflow manager 112 may be provided for carrying out the technical assessment phase of the data analysis step 106. The main objectives of the workflow manager 112, in general, are to identify uncertainties related to the geology of the formation (e.g., traps, reservoirs, seals, sources, migration/timing, petrophysical parameters, fluids, etc.), original amount of hydrocarbons in place, estimated ultimate recovery (baseline and alternative scenarios), recovery efficiency, and any further data and acquisitions that may be requirement. These objectives are accomplished using data from well, operations, and facilities analysis as well as production technology value estimations. The resulting deliverables may include, in some embodiments, infill, workover candidates, production forecasts, reactivation candidates, injection candidates, and recompletion candidates.

Figure 2:
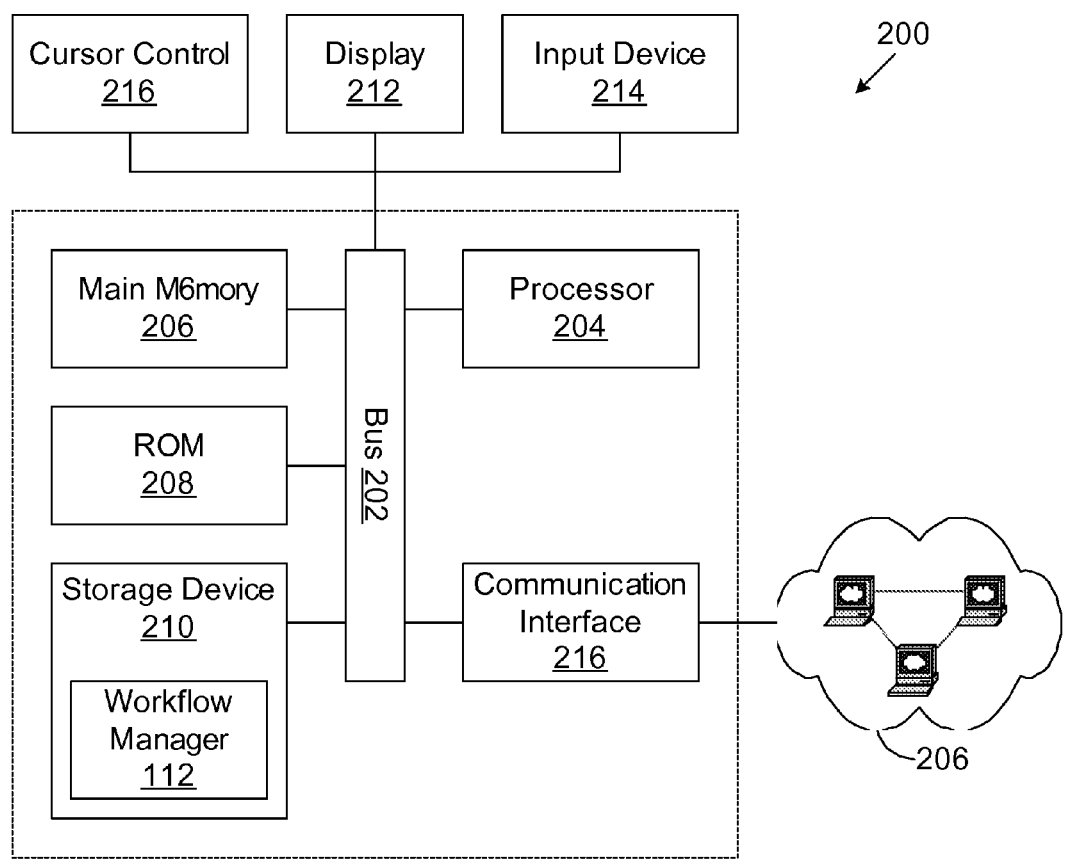
FIG. 2 illustrates an exemplary block diagram of a system that may be used for the workflow manager according to embodiments of the invention.

In some embodiments, the workflow manager 112 may be composed of one or more software applications. The software applications may reside on and be executed by one or more computer systems. FIG. 2 illustrates an exemplary computer system 200 on which the workflow manager 112 may reside and be executed. In some embodiments, the computer system may include a bus 202 or other communication mechanism for communicating information and a processor 204 coupled with the bus 202 for processing information. The computer system 200 may also include a main memory 206, such as a random access memory (RAM) or other dynamic storage device, coupled to the bus 202 for storing computer-readable instructions to be executed by the processor 204. The main memory 206 also may be used for storing temporary variables or other intermediate information during execution of the instructions to be executed by the processor 204. The computer system 200 may further include a read-only memory (ROM) 208 or other static storage device coupled to the bus 202 for storing static information and instructions for the processor 204. A computer-readable storage device 210, such as a magnetic disk or optical disk, may be coupled to the bus 202 for storing information and instructions for the processor 204.

The computer system 200 may be coupled via the bus 202 to a display 212, such as a cathode ray tube (CRT), for displaying information to a user. An input device 214, including, for example, alphanumeric and other keys, is coupled to the bus 202 for communicating information and command selections to the processor 204. Another type of user input device is a cursor control 216, such as a mouse, a trackball, or cursor-direction keys for communicating direction information and command selections to the processor 204 and for controlling cursor movement on the display 212. The cursor control 216 typically has two degrees of freedom in two axes, a first axis (e.g., x) and a second axis (e.g., y), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media include, for example, optical or magnetic disks, such as the storage device 210. Volatile media include dynamic memory, such as main memory 206. Transmission media include coaxial cables, copper wire and fiber optics, including wires of the bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CDROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the computer system 200 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The computer system 200 also may include a communication interface 218 coupled to the bus 202. The communication interface 218 provides a two-way data communication coupling between the computer system 200 and the network 220. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. In any such implementation, the communication interface 218 sends and receives electrical, electromagnetic, optical, or other signals that carry digital data streams representing various types of information.

In accordance with embodiments of the invention, the workflow manager 112 may reside on the computer system 200, for example, on the storage device 210. The workflow manager 112 may include a number of components, tools, and/or modules, each one of which may be used to perform one or more tasks of the technical assessment phase. The components, tools, and/or modules may be integrated into a single software package, or each component, tool, and/or module may be a stand-alone software application independent of other components, tools, and/or modules. Following is a discussion of the operation of workflow manager 112 in more detail.

Figure 3:
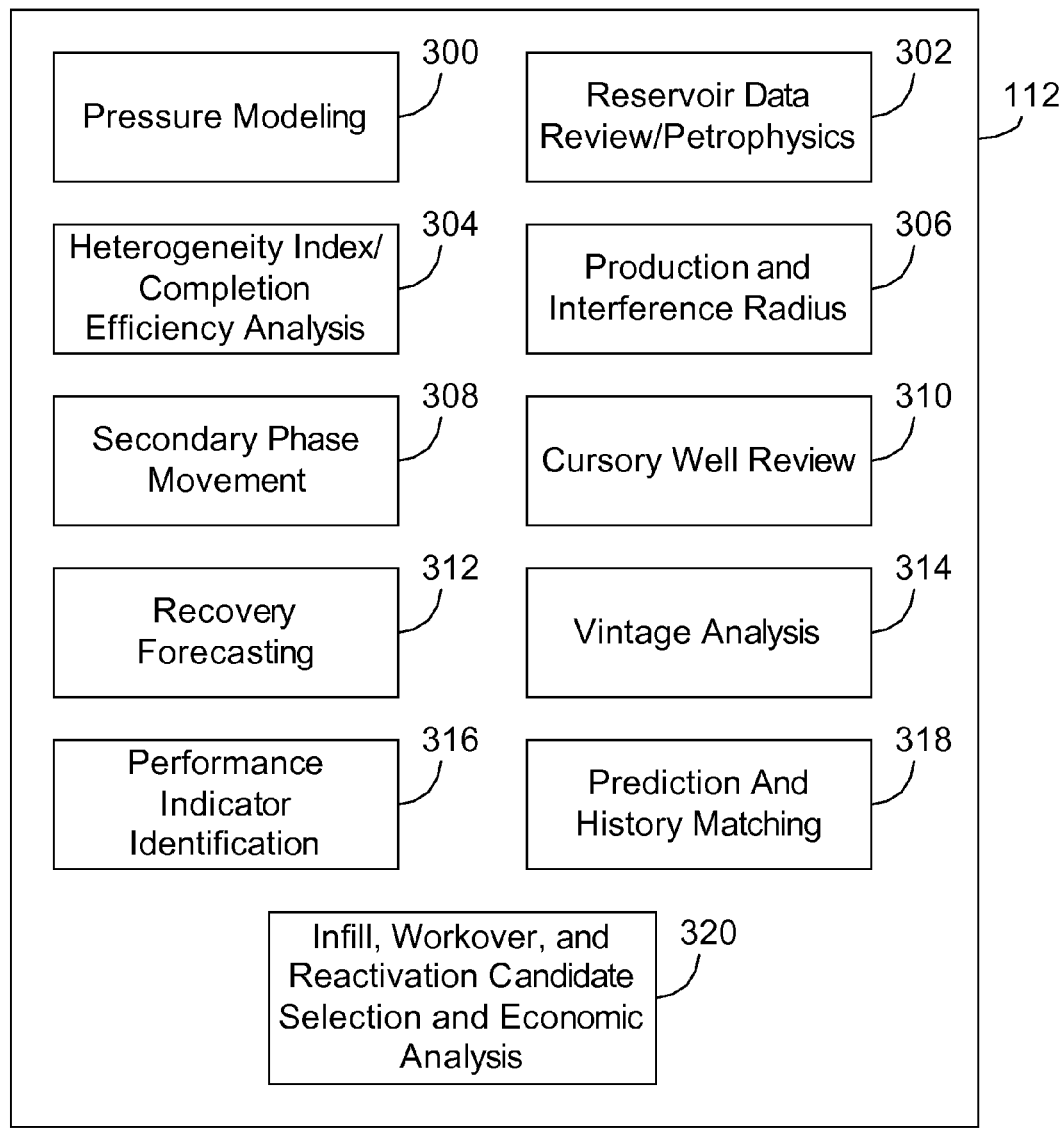
FIG. 3 illustrates an exemplary block diagram of the workflow manager according to embodiments of the invention.

Referring now to FIG. 3, in some embodiments, the workflow manager 112 is designed to facilitate completion of a predefined set of engineering tasks. These tasks are generally known to those having ordinary skill in the art and may include, for example, pressure modeling 300, reservoir data review/petrophysics 302, heterogeneity index/completion efficiency analysis 304; production and interference radius 306; secondary phase movement 308; cursory well review 310; recovery forecasting 312; vintage analysis 314; performance indicator identification 316; prediction and history matching 318; and infill, workover and reactivation selection 320. The workflow manager 112 facilitates completion of these tasks 300-320 by imposing a predefined workflow (discussed with respect to FIGS. 6A-6B) and tracking the progress of the individual tasks. Progress tracking of the individual tasks 300-320 may be accomplished using techniques similar to those employed in commercially available project planning and management applications.

In some embodiments, it has been observed over time that the specific selection of the tasks 300-320 constitutes an optimal set of tasks for the technical assessment phase (FIG. 1). Those having ordinary skill in the art will of course recognize that one or more engineering tasks may be added to (or deleted from) the above list as needed for a particular brownfield assessment. Furthermore, by performing these tasks 300-320, and in a certain order, for example, the order enumerated in FIG. 3, the technical assessment phase progresses more smoothly and in the least amount of time. Accordingly, by imposing these tasks 300-320, the workflow manager 112 incorporates the expert knowledge and best practices observed over time regarding the selection and ordering of the operations 300-320. The result is a significant reduction in the time required to complete a brownfield assessment as well as deliverables that are more consistent from project to project and engineer to engineer.

In one embodiment, the workflow manager 112 may be implemented as a stand-alone computer-based application and the computer system 200 (FIG. 2) may be a stand-alone computer (e.g., workstation, desktop computer, laptop computer, etc.) hosting the application. In other embodiments, the workflow manager 112 may be implemented as a proprietary online application accessible only via a private network. In the latter case, the computer system 200 may be a conventional application server hosting the proprietary online application. In either case, the workflow manager 112 is designed to have appropriate security mechanisms in place to prevent unauthorized access.

FIGS. 4a-4f, 5, 6a-6b, and 7-14 illustrate an exemplary implementation of the various components of the workflow manager 112 as one or more presentation screens. For convenient reference, the presentation screens may be organized as follows: user interview, data loading, petrophysics, DCA (Decline Curve Analysis), outlier identification, results, setup, analysis, and economics. A user may then interact with and otherwise use the workflow manager 112 via these various presentation screens. It should be noted that the presentation screens shown here represent merely one possible implementation of the workflow manager 112. Those having ordinary skill in the art will understand that numerous other implementations and designs may be used without departing from the scope of the invention.

Referring first to FIGS. 4a-4f, an exemplary set of user interview presentation screens of the workflow manager 112 is shown. The user interview presentation screens allow a user to enter information into the workflow manager 112 regarding the reservoir being developed, each screen pertaining to a different type of information about the reservoir. For example, there may be project information presentation screen, a reservoir characterization presentation screen, and an operating strategy presentation screen. There may also be a feedback presentation screen for providing feedback to the user about the project based on the reservoir characterization and an economic analysis presentation screen for displaying various economic indicators to the user.

Figure 4A:
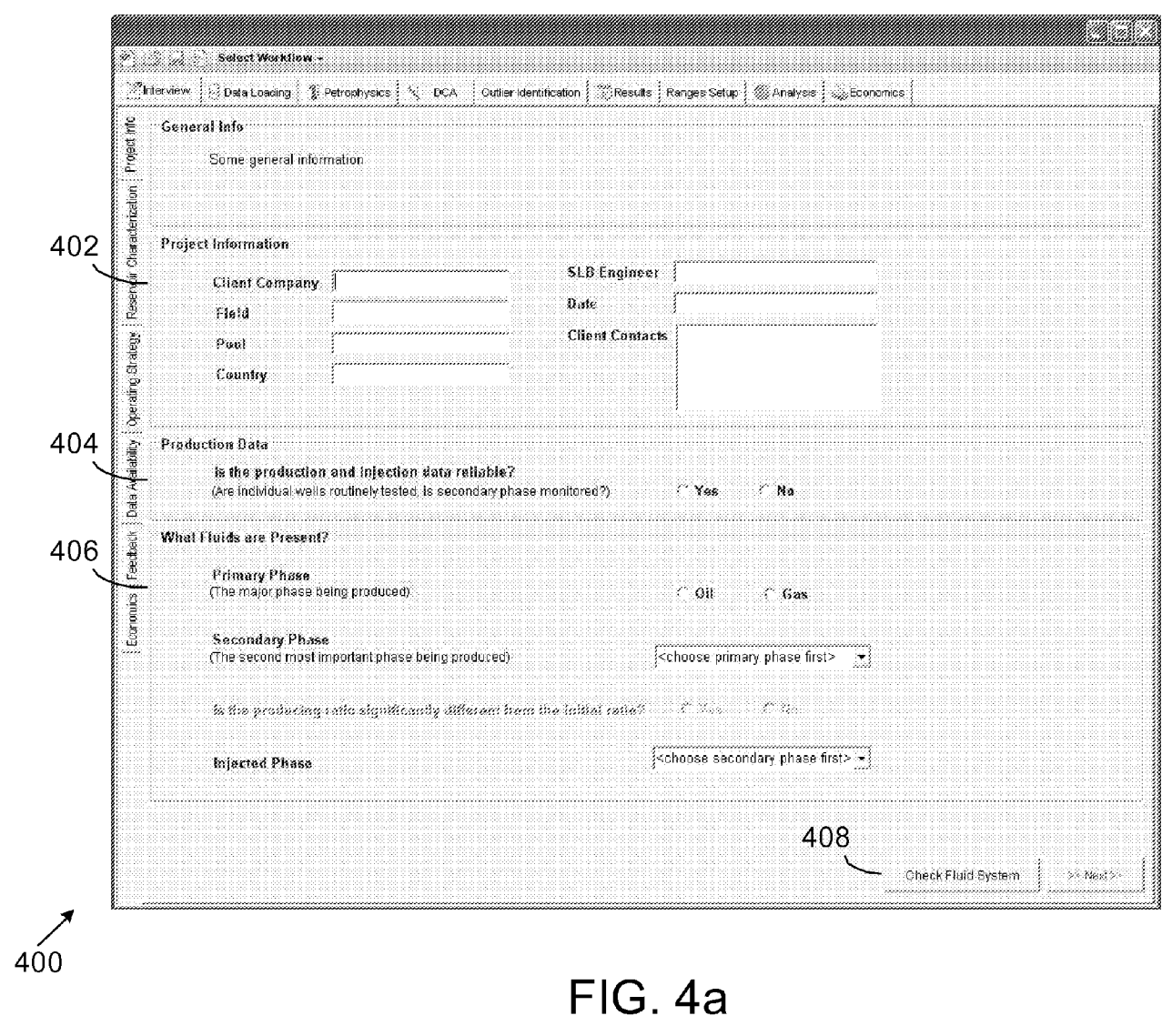

FIG. 4a illustrates an exemplary project information screen 400 for allowing a user to enter project information about the reservoir being developed into the workflow manager 112. In one implementation, the project information screen may include a well information section 402 for allowing a user to enter basic information about the project (e.g., the owner or operator of the brownfield, the field name, location, etc.), a production data section 404 for indicating whether production data and injection data are reliable (e.g., are individual wells tested? is secondary phase monitored?), and a fluids present section 406 for identifying the phase information, including primary phase information, secondary phase information, and injected phase information. These sections 402-406, as well as other sections discussed herein, may be in the form of radio buttons, check boxes, and/or drop down lists that the user may select to enter the information, and/or they may be free-form fields for the user to key in the information. A check fluid system button 408 allows the user to run a comparison of the information provided by the user against actual data from the reservoir (see FIG. 5).

Figure 4B:
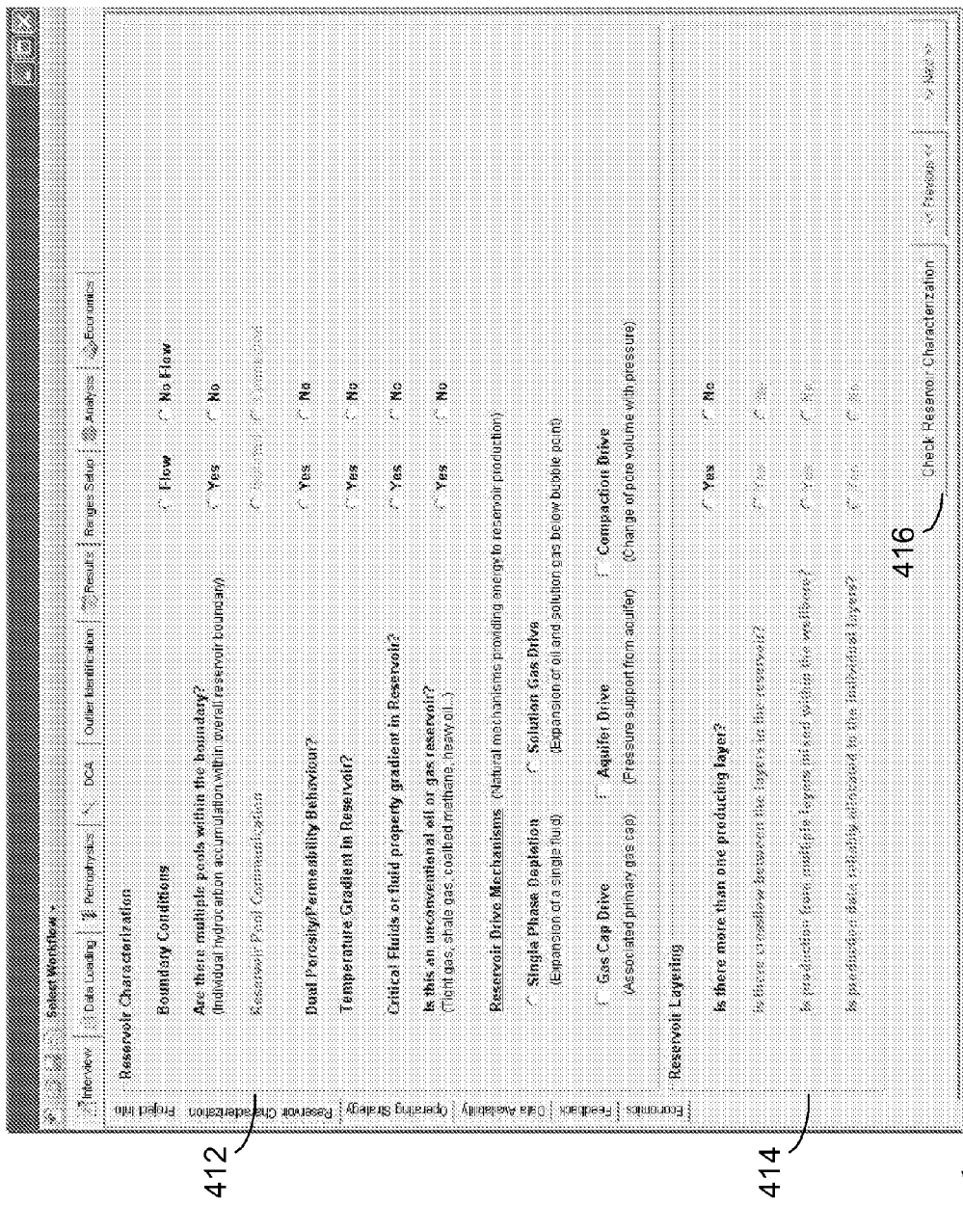

FIG. 4b illustrates an exemplary reservoir characterization presentation screen 410 for allowing a user to characterize the reservoir being developed. This presentation screen 410 may include, in one implementation, a reservoir characterization section 412 and a reservoir layering section 414. The reservoir characterization section 412 allows the user to specify various information about the reservoir (e.g., boundary conditions, whether there are multiple pools within the boundary, any dual porosity/permeability behavior, temperature gradients, whether there is critical fluid or fluid property gradient). The user may also identify the reservoir drive mechanism, including a gas cap drive, an aquifer drive, and a compaction drive, and also whether the drive mechanism is single phase depletion or a solution gas drive. In a similar manner, the reservoir layering section 414 allows the user to specify various information about the reservoir layers (e.g., whether there is more than one producing layer, whether there is crossed flow between layers, whether production from the multiple layers is mixed within the wellbore, and whether production is reliably allocated to the individual layers). A check reservoir characterization button 416 allows the user to run a comparison of the information provided by the user against actual data from the reservoir (see FIG. 5).

Figure 4C:
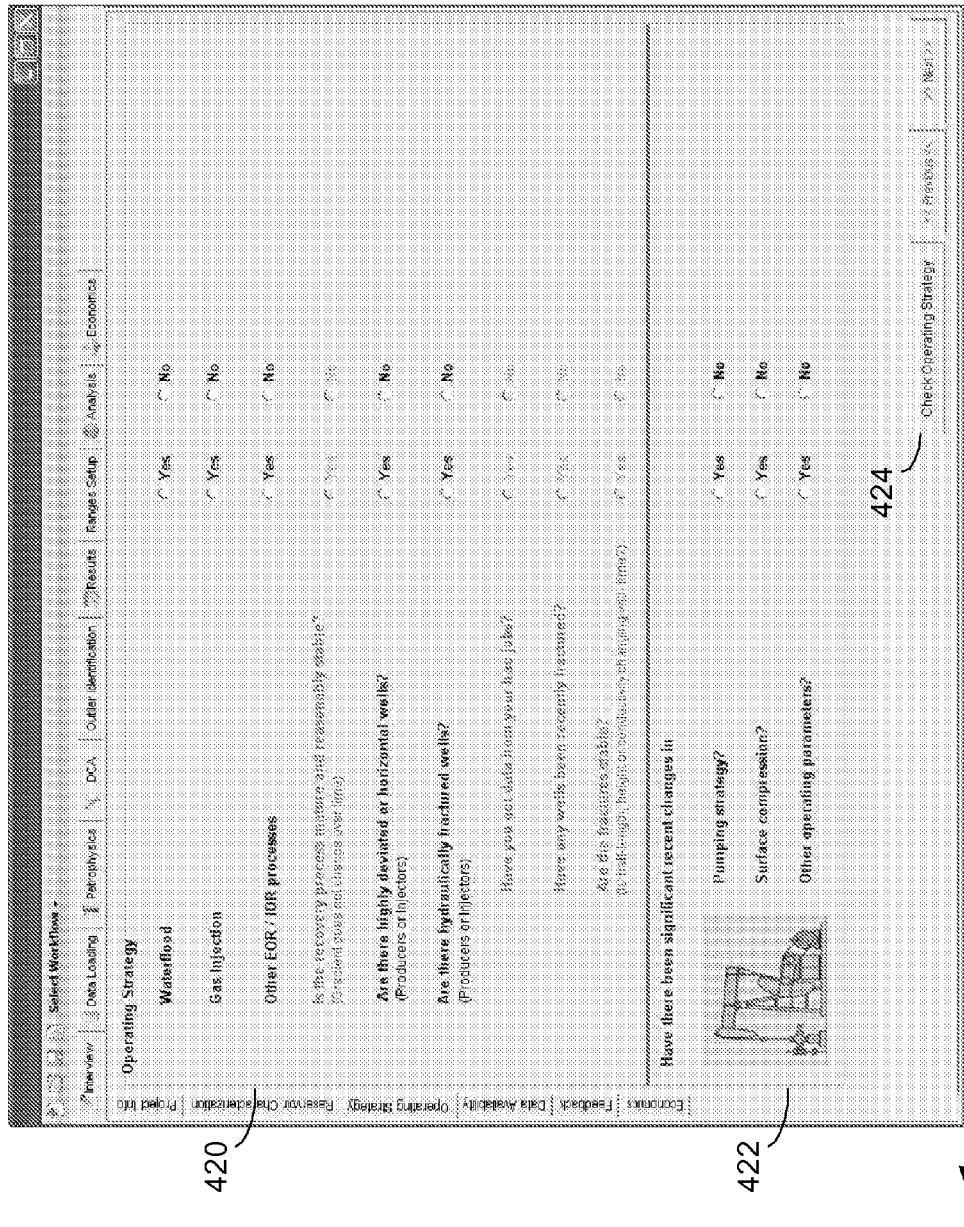

FIG. 4c illustrates an exemplary operating strategy presentation screen 418 for allowing a user to enter information into the workflow manager 112 regarding the operating strategy used on the reservoir being developed. In one implementation, the operating strategy presentation screen 418 may include an operating strategy section 420 and recent changes section 422. The operating strategy section 420 allows the user to specify, for example, whether waterflood, gas injection, or other enhanced oil recovery methods were used. If an enhanced oil recovery method was used, the operating strategy section 420 allows the user to specify whether the recovery process was mature and reasonably stable (i.e., the gradient does not change over time). Other information that may be provided in the operating strategy section 420 include either there are highly deviated or horizontal wells, and whether there are hydraulically fractured wells. In the latter case, the operating strategy section 420 also allows the user to specify whether there is data for the fracture job and whether any wells have been fractured recently. The recent changes section 422 allows the user to specify whether a pumping strategy was used, whether surface compression was used, and whether there were other operating parameters. A check operating strategy button 424 allows the user to run a comparison of the information provided by the user against actual data from the reservoir (see FIG. 5).

Figure 4D:
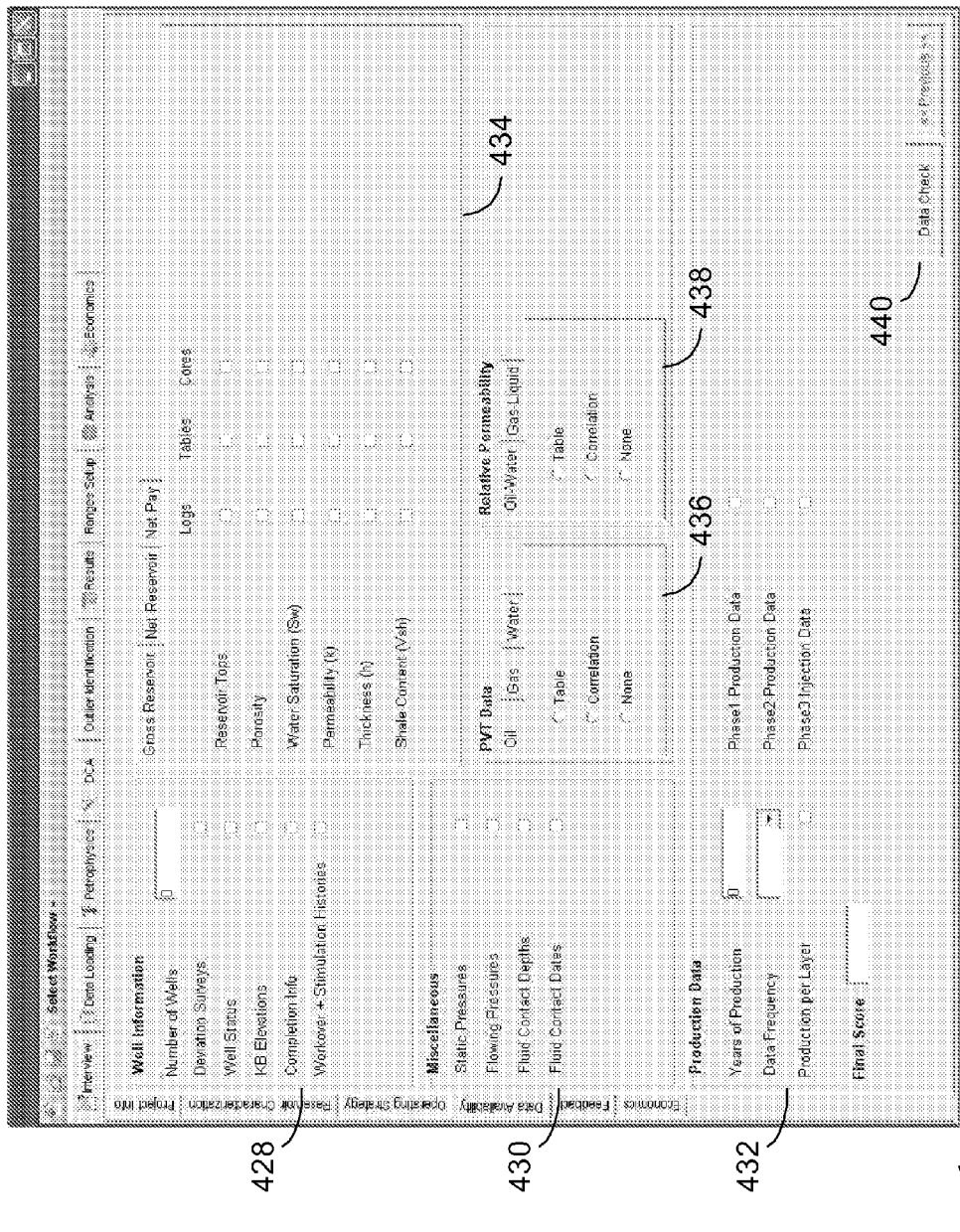

FIG. 4d illustrates an exemplary data availability presentation screen 426 for allowing a user to identify the types of data provided to the workflow manager 112. This presentation screen 426, in one implementation, may include a well information section 428, a miscellaneous section 430, and a production data section 432. Also present on the data availability presentation screen 426 is porosity/permeability section 434, a PVT (pressure, volume, temperature) data section 436, and a relative permeability section 438. The well information section 428 allows the user to specify whether various types of well information are available (e.g., the number of wells, whether deviation surveys, well status, KB elevations, completion information, and work over & stimulation histories data are available). The miscellaneous section 430 allows the user to specify whether various miscellaneous types of data are available (e.g., static pressures, flowing pressures, fluid contact depth, and fluid contact dates). The production data section 432 allows the user to specify whether various types of production data are available (e.g., the number of years of production, data frequency, and production per layer). The porosity/permeability section 434 allows the user to specify whether various types of porosity/permeability data are available (e.g., reservoir tops, porosity, water saturation, permeability, thickness, and shale content). In a similar manner, the PVT data section 436 and the relative permeability section 438 allow the user to specify whether certain types of PVT data and permeability data are available (e.g., table, correlation, none). In some embodiments, the user may perform a data check after he/she has characterized data by pressing a date a check button 440. The data check essentially compares the characterization of the data provided by the user with the total data that is available (see FIG. 5).

Figure 4E:
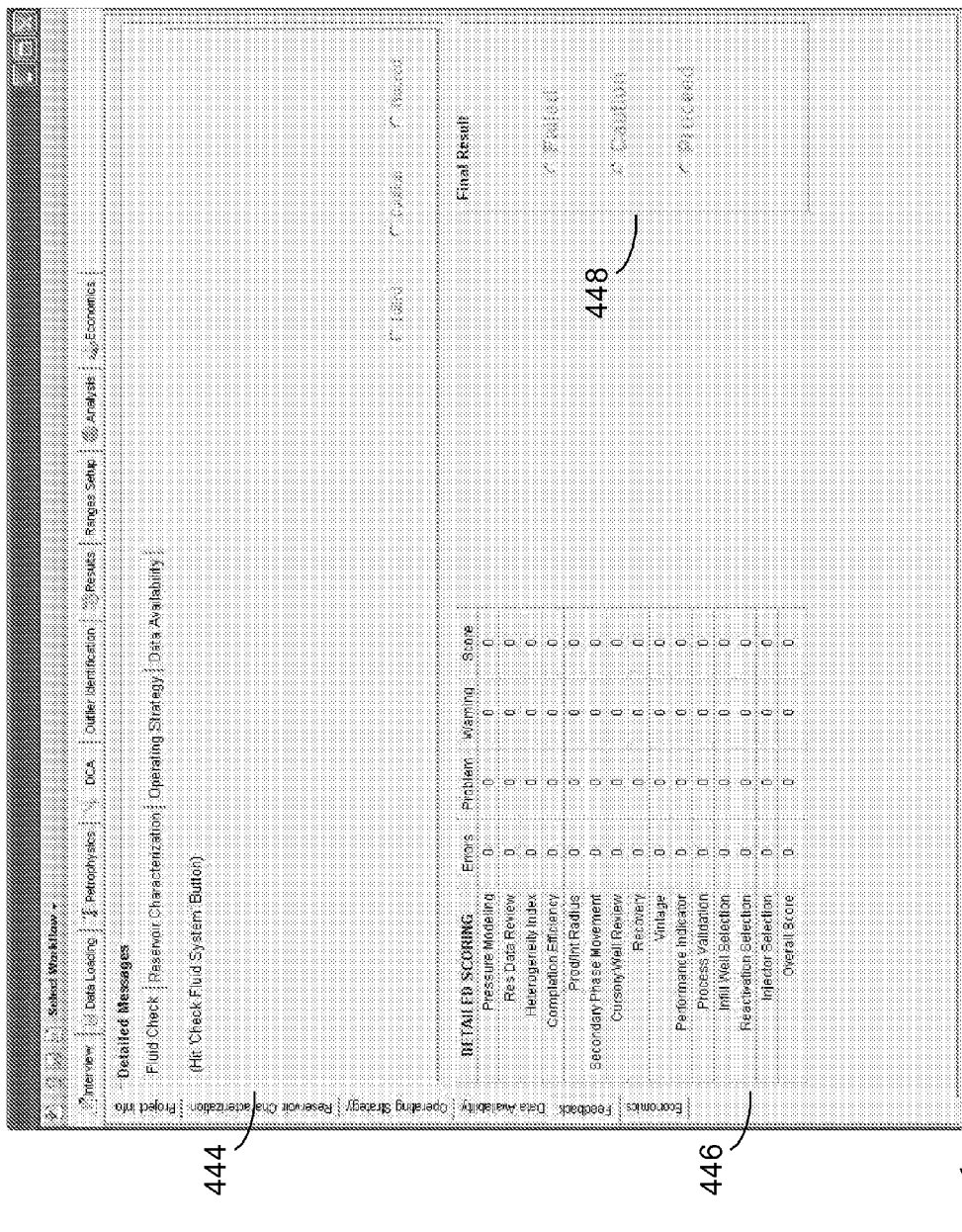

In some embodiments, the user interview presentation screens may also include an analysis or feedback screen for providing feedback from the workflow manager 112 to the user in the form of a technical analysis of the data. This is illustrated in FIG. 4e, which shows a feedback screen 442 that, in some implementations, may include a detailed messages section 444, a detailed scoring section 446, and a final result section 448. The detailed messages section 444 provides detailed comments and recommendations regarding any omissions that may have occurred or potential issues that may arise with respect to some or all of the previous user interview presentation screens. These comments and recommendations may be based on, for example, the expert knowledge and best practices that have been identified over time. For example, the detailed messages section 444 may contain a suggestion that the user pressed the check fluid system button 408 (see FIG. 4a) in order to run a comparison of the fluid data provided by the user against actual data from the reservoir. As for the detailed scoring section 446, this section provides an objective score for each one of a plurality of parameters that are selected based on the expert knowledge and best practices that have been accumulated over time. The parameters may include, for example, pressure modeling, reservoir data review, heterogeneity index, completion efficiency, production radius, injection radius, interference radius, secondary phase movement, cursory well review, recovery, vintage, performance indicator, process validation, infill well selection, reactivation selection, and injector selection. The objective score may be based on, for example, the number of errors encountered, the number of problems encountered, and the number of warnings issued for each of the above parameters. Such errors, problems, and warnings are well known to those having ordinary skill in the art and are therefore not described here. The total number of errors, problems, and warnings may then be provided along with an overall score. Based on the overall score, the final result section 448 indicates whether the reservoir being developed has failed to meet certain criteria and therefore should not be pursued at this time, whether the project has satisfied the relevant criteria and all parties should proceed as planned, or whether the project should be undertaken only with a certain amount of caution.

Figure 4F:
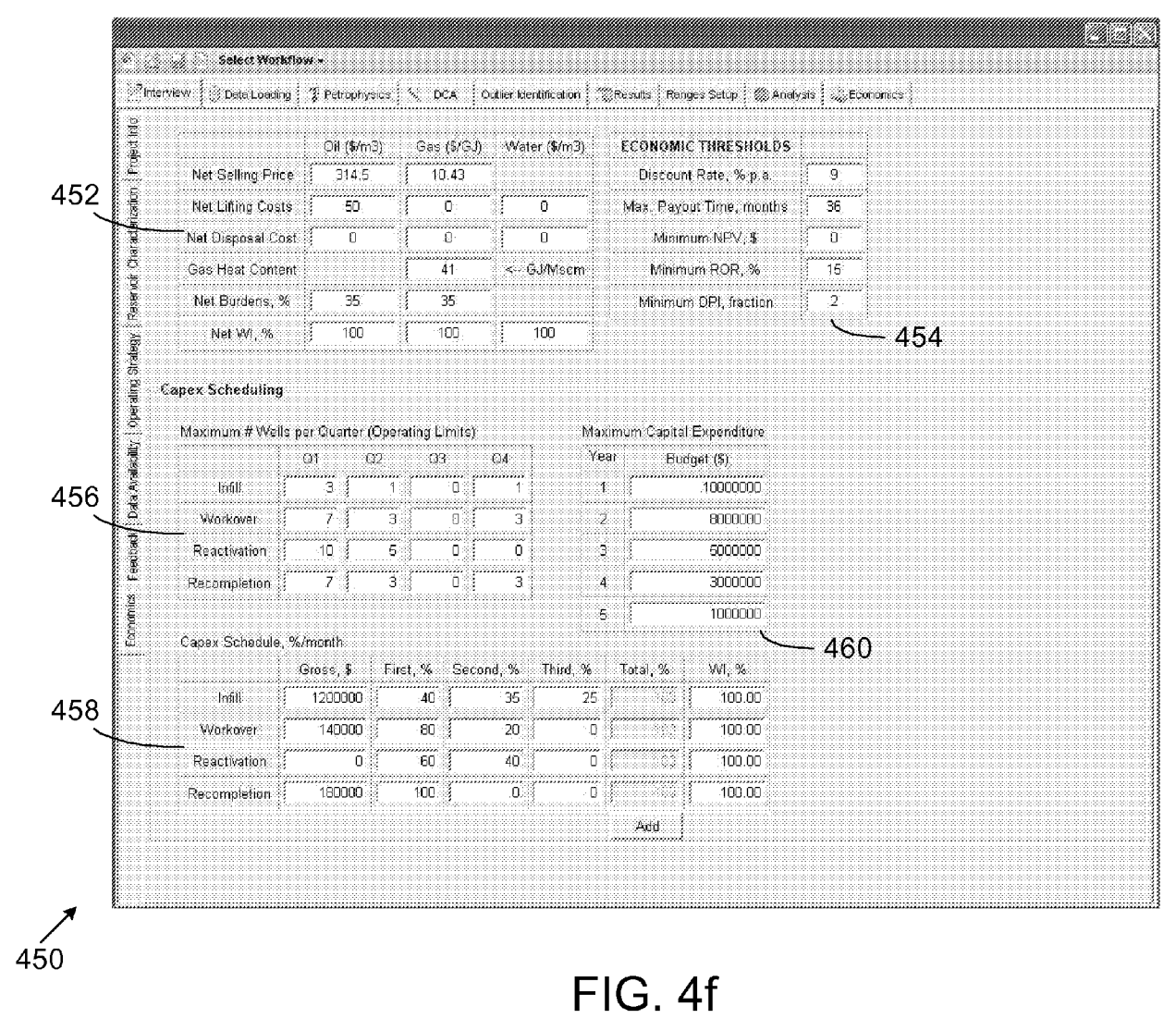

In some embodiments, the user interview presentation screens may further include an economic analysis screen for providing feedback from the workflow manager 112 to the user in the form of an economic analysis of the data. This is illustrated in FIG. 4f, which shows an economic analysis screen 450 that, in some implementations, may include a price/cost section 452, an economic threshold section 454, and one or more capital expenditure scheduling sections, including a number of wells section 456, a capital expenditure section 458, and a maximum capital expenditure section 460. The price/cost section 452 may display, for example, the net selling price, net lifting cost, net disposal cost, net burden percentage, and net WI (Working Interest) for the oil, gas, and water recovered from the project. For gas, the price/cost section 452 may also display the gas heat content in addition to the other indicators. The economic threshold section 454 displays various economic indicators for the project as calculated by the workflow manager 112 from the data provided thereto, including the discount rate, maximum payout time, minimum net present value (NPV), minimum rate of return (ROR), and minimum DPI (Discounted Profit: Investment Ratio). The number of wells section 456 displays the maximum number of well that may be operated, including the number of infills, workover, reactivation, and recompletion. In some implementations, this number of wells is provided on a per quarter basis, although other bases may certainly be used. The capital expenditure section 458 displays the capital expenditure estimates from the workflow manager 112 for the infills, workover, reactivation, and recompletion wells. Finally, the maximum capital expenditure section 460 displays the maximum capital expenditure estimated by the workflow manager 112 based on, for example, an annual basis.

Figure 5:
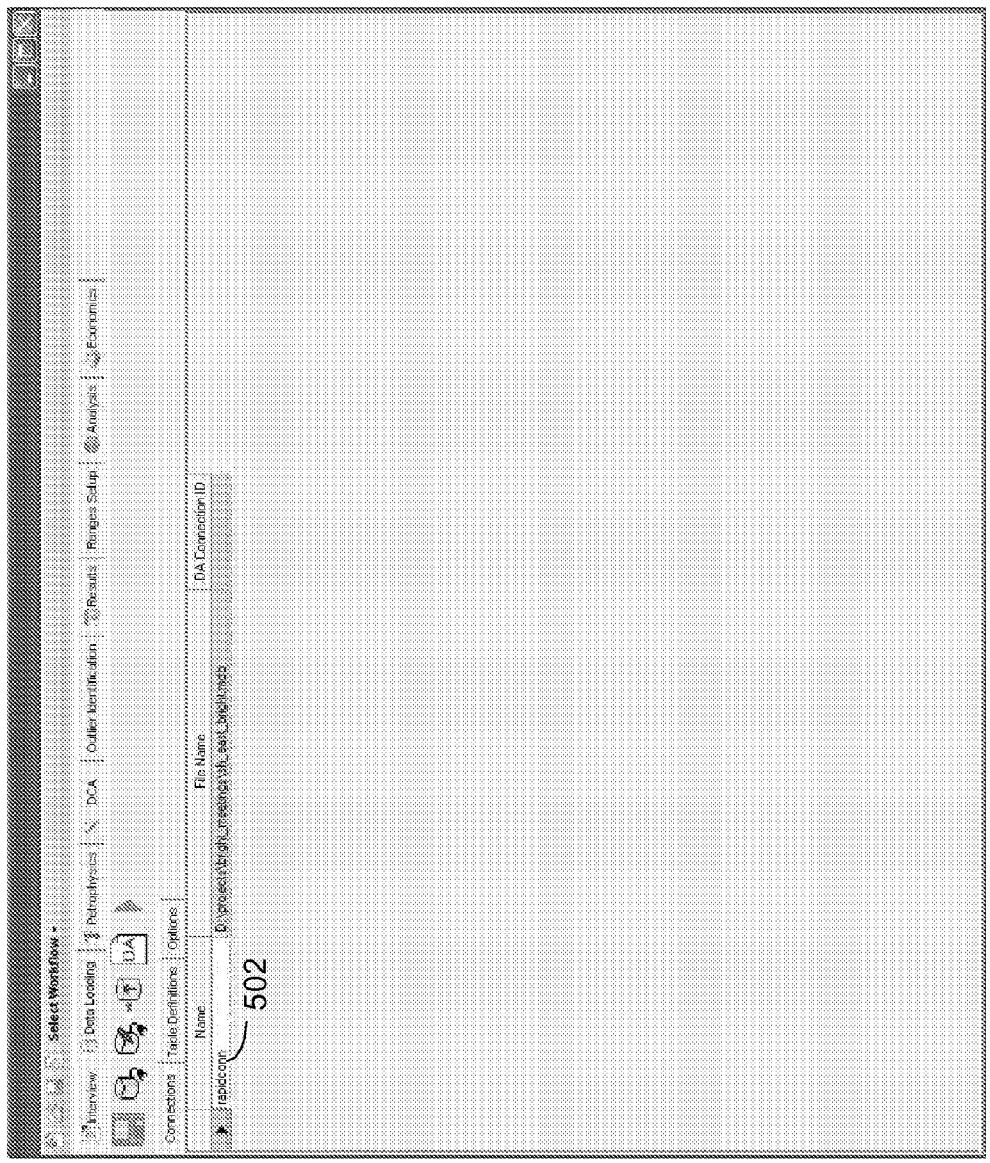
FIG. 5 illustrates an exemplary database loading screen of the workflow manager according to embodiments of the invention.

Turning now to FIG. 5, in some embodiments, the workflow manager 112 may include a data loading screen 500. The data loading screen 500 allows data regarding well, operations, and facilities analysis as well as production technology value estimations to be inputted into the workflow manager 112. This data, called historical data, is typically acquired by the owners and/or operators of the brownfield and stored in one or more databases. A user may then select a particular database by entering the name of the database in a database field 502 of the data loading screen 500. The data in the selected database may then be uploaded/transferred to the workflow manager 112 where it may be stored, for example, in one or more databases managed by or accessible to the workflow manager 112. In some cases, such data may be converted, either before or after the upload/transfer, to a format that is usable by the workflow manager 112.

Figure 6A:
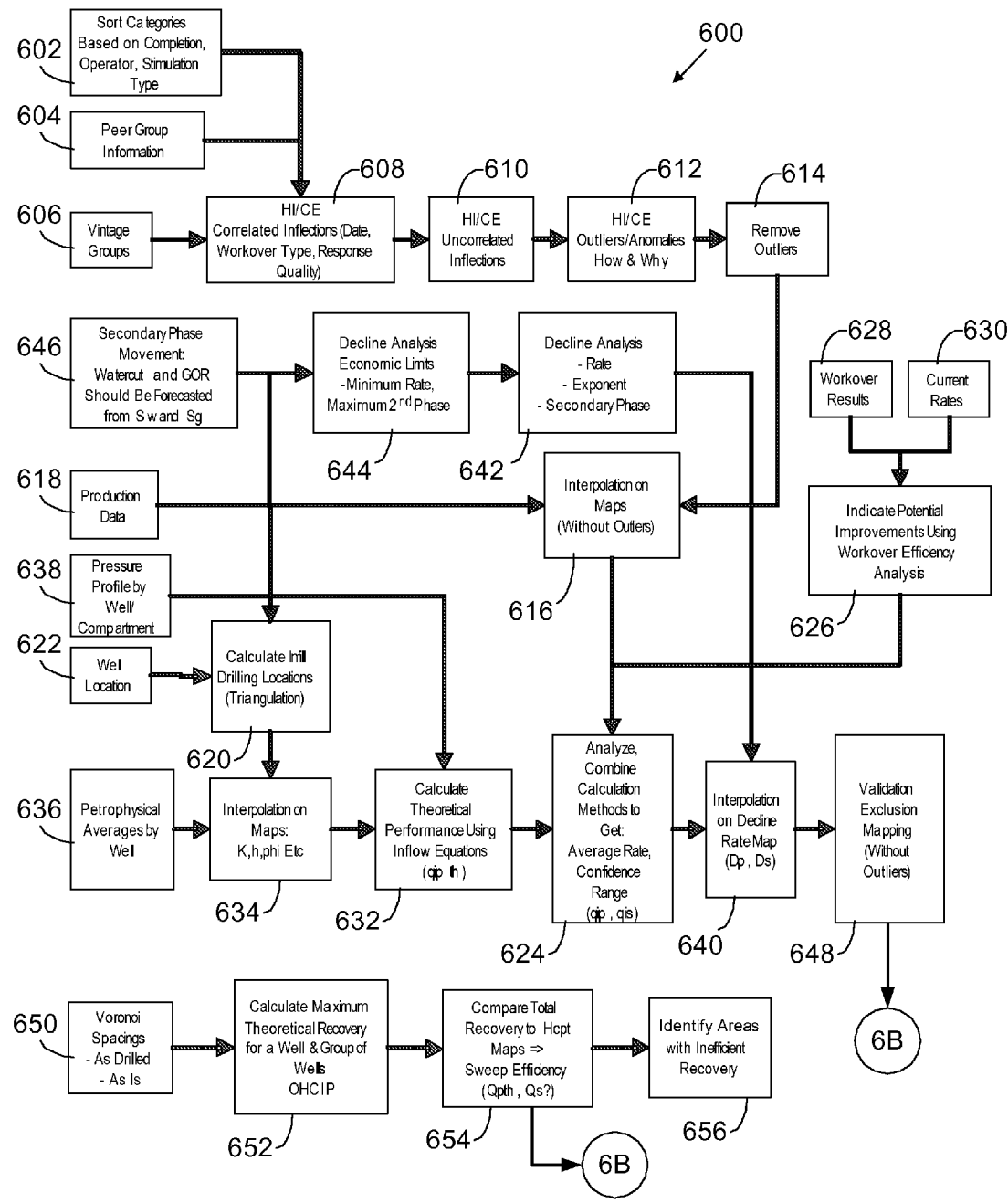
FIGS. 6a-6b illustrate an exemplary workflow of the workflow manager according to embodiments of the invention.
Figure 6B:
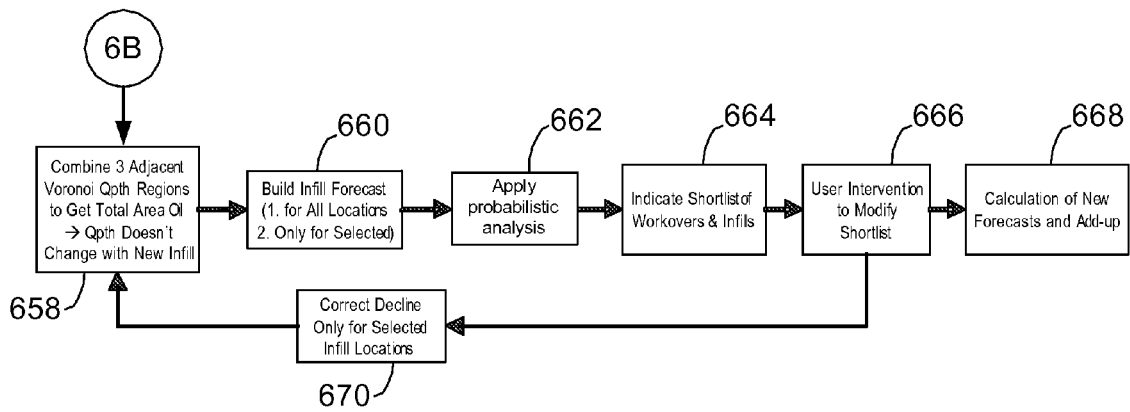

FIGS. 6a-6b illustrate an exemplary workflow 600 that may be performed by the workflow manager 112 based on the data entered into the workflow manager. As can be seen, the workflow 600 is composed of a series of operations, each operation producing data, information, and/or results that may be used in one or more other operations. These operations combine the results of tasks 300-320 shown in FIG. 3 in a structured decision making process. When one operation is completed, the workflow manager 112 closes that operation and proceeds to the next operation, and so on, until all operations are completed. Note that although discrete operations are shown, those having ordinary skill in the art will understand that each operation may be divided into several operations, or several operations may be combined to form a single operation, as needed. Following is a more detailed discussion of the exemplary workflow 600.

Referring first to FIG. 6a, in one embodiment of the workflow 600, categories for data 602 containing information on well completion, operator, and stimulation type are provided to the workflow manager 112. This data, along with peer group information 604 and vintage group information 606 (where well data is combined based on vintage) is provided to a heterogeneity index/completion efficiency (HI/CE) process 608 whereby correlated inflections are used to determine statistical outliers and anomalies. Thereafter, the workflow 600 proceeds to an uncorrelated inflections operation 610 where uncorrelated statistical outliers/anomalies are identified. Thereafter, an analysis of the cause (i.e., how and why) of the statistical outliers/anomalies is performed in operation 612, followed by an outlier removal operation 614 to remove the statistical outliers/anomalies as warranted. The results of that operation are subsequently used in an interpolation on maps operation 616 that interpolates well production data 618 onto a map of the brownfield (an example of which can be seen in FIG. 7).

The results of the interpolation on maps operation 616 are then provided to an operation 624 that analyzes and combines calculation methods to obtain an average production rate and confidence range. The average production rate and confidence range operation 624 also uses data from an operation 626 that indicates potential production improvements using workover efficiency analysis. Workover results 628 and current production rates 630, inputted previously into the workflow manager 112, are used to perform the latter operation 626. The average production rate and confidence range operation 624 further uses data from an operation 632 that calculates the theoretical well performance based on well-known inflow equations using, for example, theoretical initial production rate of the primary fluid phase ($q_{ip-th}$). This operation 632, in turn, uses the results of an interpolation on maps operation 634 that interpolates the well production data onto maps based on, for example, the permeability (K), thickness (h), and porosity (phi) of the formation. The interpolation on maps operation 634, in turn, relies on petrophysical averages by well data 636 and the results of a calculate infill drilling locations operation 620. The calculate infill drilling locations operation 620 calculates the infill drilling locations using well location data 622 and secondary phase movement data 646 (e.g., water saturation $S_w$, gas saturation $S_g$, etc.).

After the average rate and confidence range operation 624, the workflow 600 proceeds to an interpolation on production decline rate map operation 640. This operation 640 uses the results of a production decline analysis 642 based on the production rate and secondary phase production rate information. The production decline analysis operation 642, in turn, relies on the economic criteria of the decline analysis 644 specified by the user, such as a minimum acceptable primary phase production rate and maximum secondary phase production rate. The secondary phase movement data 646 mentioned above is also used for the production decline analysis 644. From the interpolation on production decline rate map operation 640, the workflow 600 proceeds to a validation, exclusion (of outliers), and mapping operation 648.

In the meantime, Voronoi region spacing data 650, including as-is data and as-drilled data, is provided to a calculating original hydrocarbon in place (OHCIP) operation 652 for a well and/or groups of wells. Thereafter, a comparison of total recovery to OHCIP maps operation 654 may be performed to obtain the secondary phase sweep efficiency (e.g., by comparing the theoretical cumulative production of the primary phase, $Q_{p-th}$, and cumulative production of the secondary phase, $Q_s$). Areas with inefficient recovery may thereafter be identified in a subsequent operation 656.

From the comparison of total recovery to OHCIP maps operation 654 and the validation exclusion mapping operation 648, the workflow 600 proceeds to an operation 658, illustrated in FIG. 6B, that combines three adjacent Voronoi regions to get the total oil area (note that the $Q_{p-th}$ does not change with new infills). The total oil area is then provided to an operation 660 that generates an infill forecast. The infill forecast may be generated for all infill locations, or it may be generated for only selected infill locations, as needed. Probabilistic analysis is subsequently applied to the infill forecasts at 662. Thereafter, the workflow 600 proceeds to an operation 664 that produces a list of injection, reactivation, workover and infill candidates. At this point, the workflow 600 may allow a user to modify the list (indicated at 666) as needed. An operation to calculate revised individual and grouped well forecasts 668 is thereafter performed, and/or a correction may be made to the production decline rate for selected infill locations at 670.

The selection of each of the above operations and the arrangement of the operations in the workflow 600 have been designed to compel completion of the tasks 300-320 (FIG. 3) in a logical and streamlined manner. It is particularly advantageous, for example, to apply probabilistic analysis to the infill forecasts in operation 662 because the probabilistic analysis is based on criteria generated to duplicate the results produced by experienced engineers for a similar hydrocarbon development.

Other advantages of the workflow 600 may include, for example, the interpolation on maps operation 616. In some embodiments, this operation may be performed using maps that are based on performance indicator results, such as the most recent oil rate; the previous four month average oil rate; the oil rate back-calculated from liquid rate; oil rate back-calculated from productivity index; and oil rate back-calculated from mobility index. The same performance indicator based maps may also be used for the validation, exclusion, and mapping operation 640.

In some embodiments, the outlier/anomalies identification operation 612 may be performed using multidimensional HI/CE relationships. To this end, adding smaller domain multidimensional HI/CE may be beneficial. Similarly, with regard to the combining of adjacent Voronoi regions to obtain the total oil area (operation 658), the maximum theoretical recovery for a group of wells surrounding an injection, reactivation, workover candidate and infill target should remain constant, since it is unlikely these techniques can be used to achieve incremental recovery. Instead, the new forecasted injection, reactivation, workover or infill locations, and the new local group will have an increased rate and, therefore, a steeper decline. The decline can be calculated using the same recoverable oil value and the new total rate for the group. For simplicity, the group may be restricted to the three closest wells.

Upon completion of the workflow 600, the results may be displayed via an analysis presentation module of the workflow manager 112. In some embodiments, the analysis presentation module may be implemented in the form of presentation screens, shown in FIGS. 7-10, through which the various results of the workflow 600 may be displayed. The presentation screens may include a petrophysics screen, a DCA screen, and outlier identification screen, and a results screen.

Figure 7:
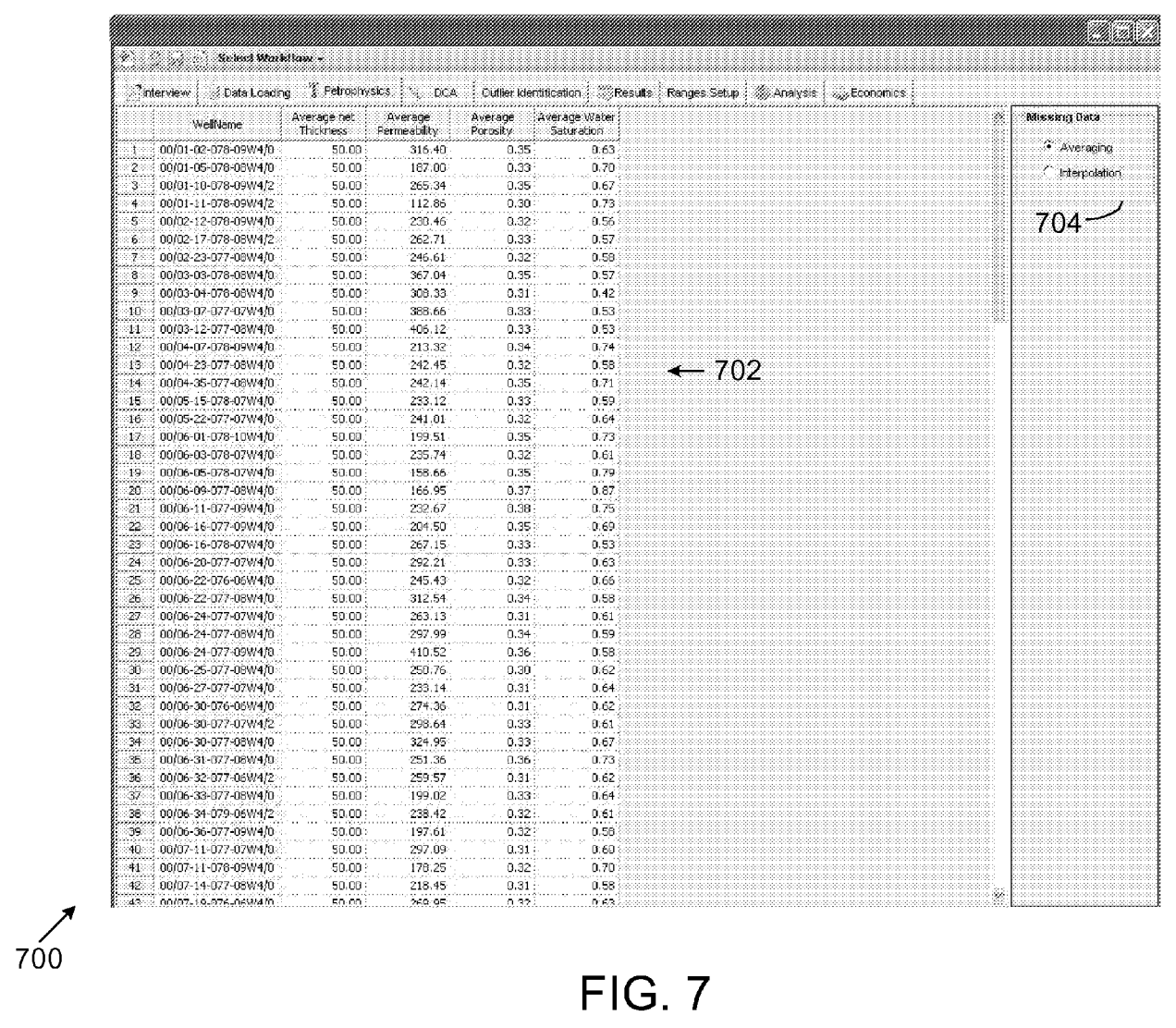

FIG. 7 illustrates an exemplary implementation of the petrophysics presentation screen 700 for presenting a table showing petrophysical data 702 loaded by the user into the workflow manager 112. As can be seen, the data includes, among other things, the well name, average net thickness, average permeability, average porosity, and average water saturation. Where data is missing from the database, the user may have the option, indicated at 704, of assigning either averaged data or interpolated data to ensure dataset completeness.

Figure 8:
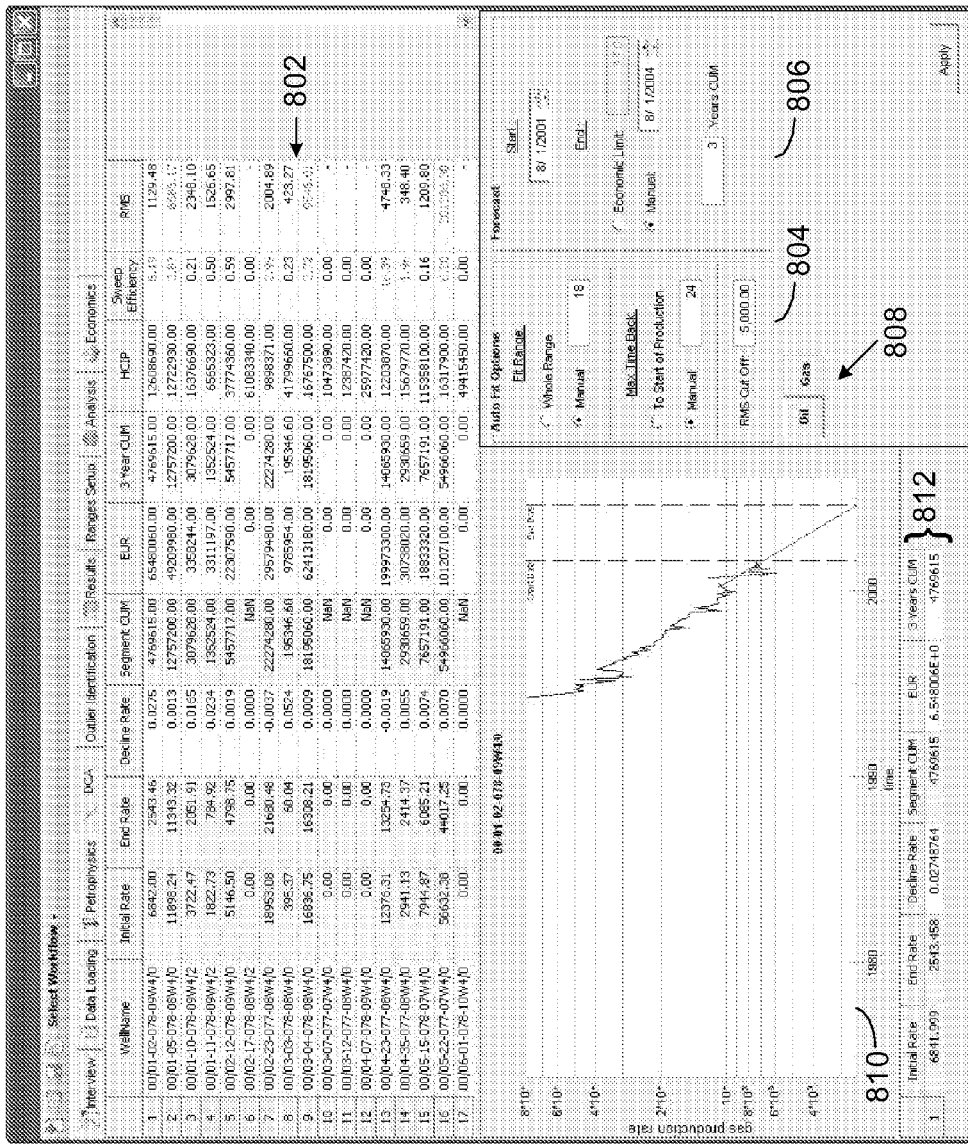
FIG. 8 illustrates an exemplary DCA (Decline Curve Analysis) screen of the workflow manager according to embodiments of the invention.

FIG. 8 illustrates an exemplary implementation of the DCA presentation screen 800 for displaying the results of the decline analysis operation 642 resulting from one or more criteria for economic criteria specified by the user in the preceding operation 644. The results of the analysis operation 642 are displayed in a table 802 that may include, for example, the initial rate, end rate, declining rate, segment CUM (cumulative production), EUR (Estimated Ultimate Recovery), 3 years CUM, HCIP (hydrocarbon in place), sweep deficiency, and RMS (Root-Mean-Square error). These results may be generated using curve-fitting processes on historically measured production data. The user may choose how much of the existing data to fit, and how contemporary it must be, via one or more auto fit options indicated at 804. Where accurate fitting is not possible, the user may be alerted to problem wells, defined using an RMS Cut Off input option of the auto fit options 804. These calculations can be performed with gas or oil as the primary production phase, selectable by the user at 806. The forecasting period can also be chosen by the user, indicated at 808, with the beginning date specified manually and the ending date either entered manually or using an economic criterion. The foregoing options and selections, and the results thereof, may be graphically presented via a chart 810, the vertical axis for which represents gas production rate and the horizontal axis for which represents time. Manual intervention in the automatically generated forecast for each well is possible using input boxes 812, including the initial rate, end rate, declining rate, segment CUM, EUR, and 3 years CUM.

Figure 9:
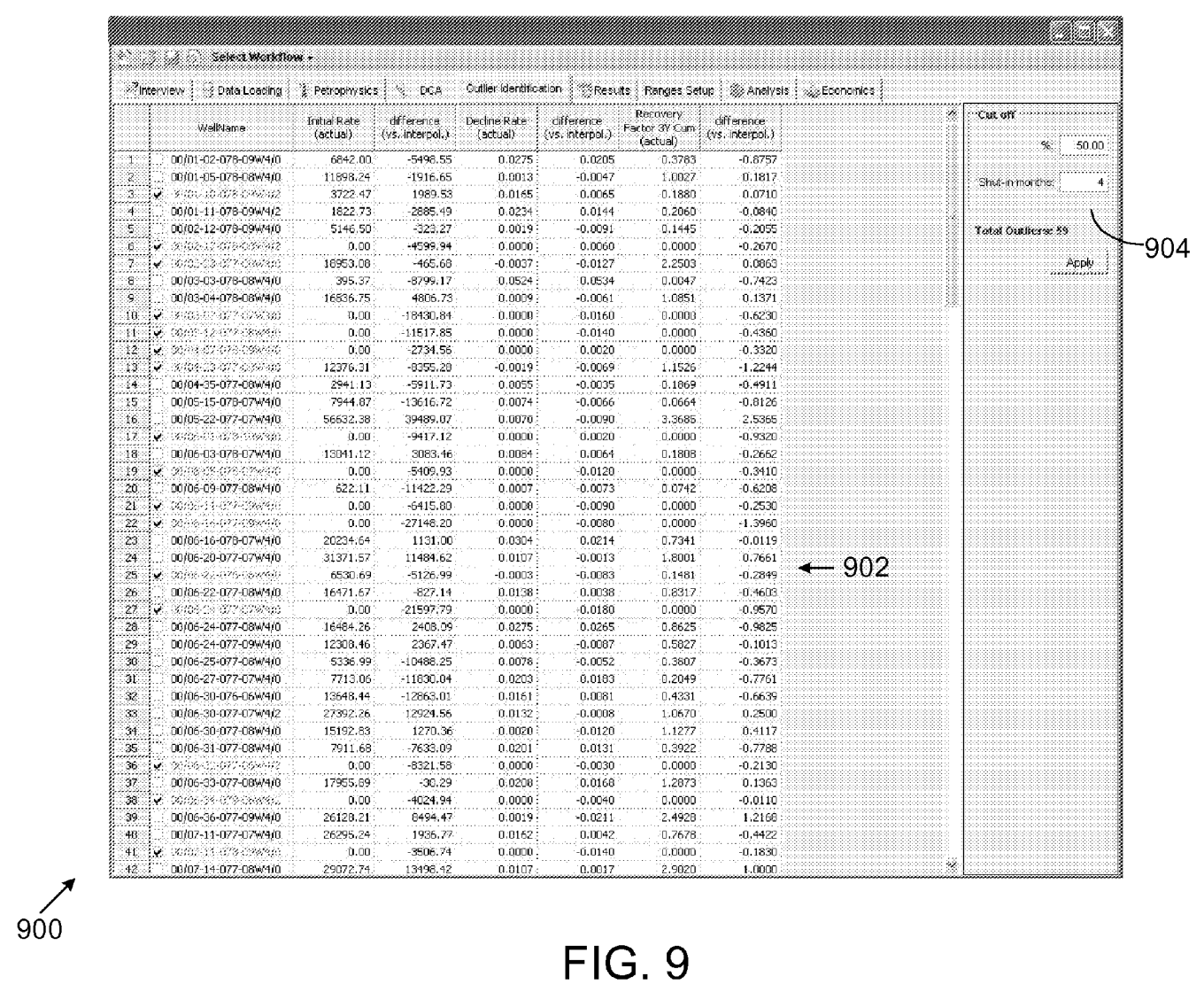

FIG. 9 illustrates an exemplary implementation of the outlier identification presentation screen 900 showing a table 902 of the results of the outlier identification operation 612. The table 902 may include, for example, the well name, actual initial rate, the difference between the actual versus interpolated initial rate, the actual decline rate, the difference between the actual versus interpolated decline rate, the actual three-year recovery factor, and the difference between the actual versus interpolated three-year recovery factor. Identification of outliers can be modified by the user using appropriate input boxes in a cutoff area 904 that can be used to change the tolerances of the identification algorithm. Manual intervention is also possible by selecting individual wells using checkboxes incorporated within the table 902 to remove the necessary outliers from subsequent calculations 614.

Figure 10:
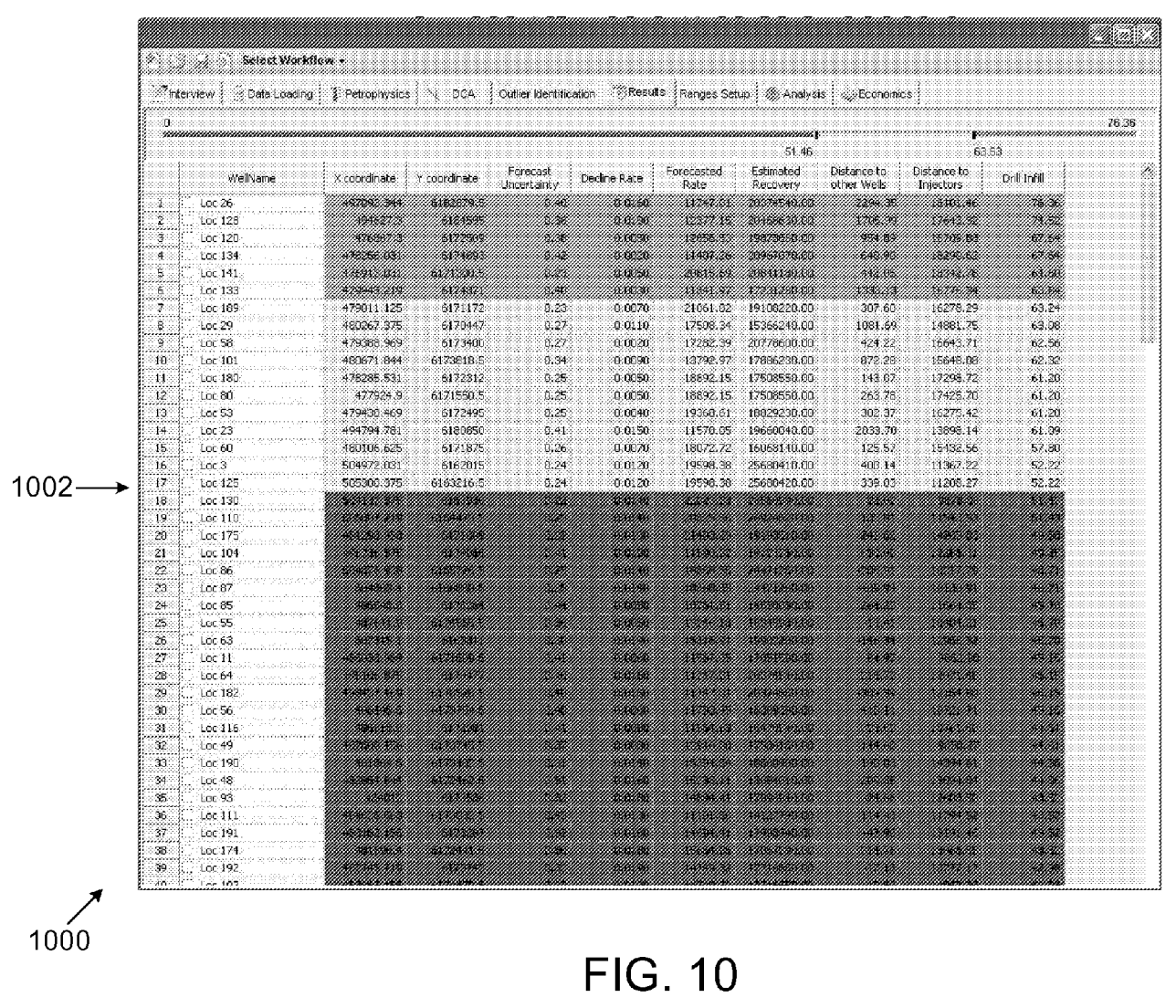

FIG. 10 illustrates an exemplary implementation of an optional results screen 1000 in which the forecasts and other information generated by the workflow manager 112 may be viewed in a table format for all wells, indicated at 1002. The optional results screen 1000 is useful for allowing the user to view information for more than one well at a time and may include, for example, the well name, map coordinates of each well (see FIG. 12), forecast uncertainty, decline rate, forecasted rate, estimated recovery, distance to other wells, distance to injector, and drill infill. A meter at the top of the table in some implementations allows the user to adjust the ranges of the color scale, assisting the visualization of good, bad, and mediocre candidates.

Figure 11:
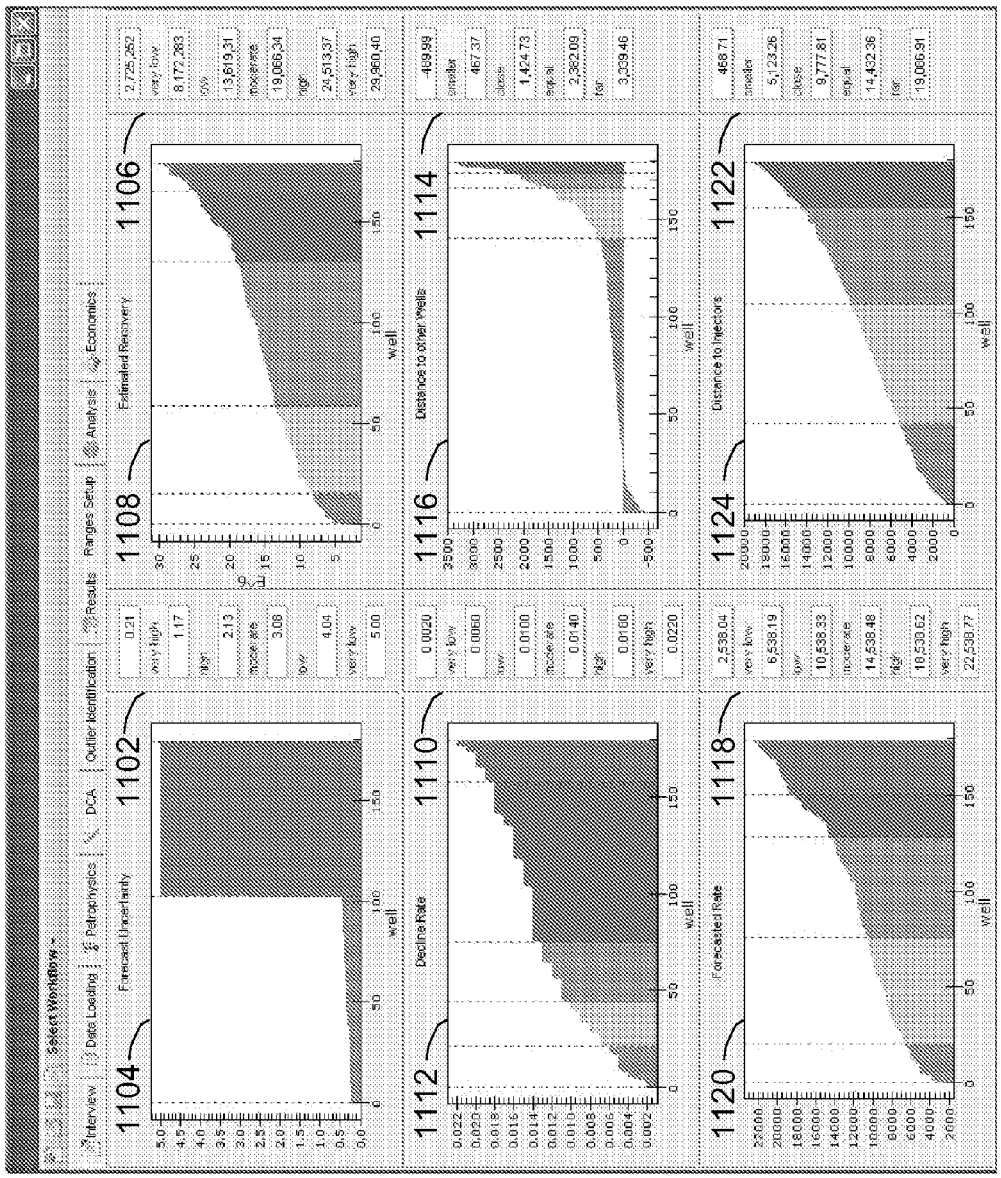
FIG. 11 illustrates an exemplary setup screen of the workflow manager according to embodiments of the invention.

In some embodiments, the workflow manager 112 may also include a refinement function for allowing the user to fine tune the various parameters of the workflow manager 112. FIG. 11 illustrates an exemplary implementation of the refinement function via a setup presentation screen 1100 that includes a plurality of configuration fields. As can be seen, in some embodiments, the configuration fields may include confidence forecast configuration fields 1102 (along with a graphical representation 1104 therefor), estimated recovery configuration fields 1106 (along with a graphical representation 1108 therefor), and production decline rate configuration fields 1110 (along with a graphical representation 1112 therefor). Other configuration fields that may be present include proximity producer configuration fields 1114, forecasted rate configuration fields 1118, and proximity injector configuration fields 1122 (along with graphical representations 1116, 1120, and 1124 therefor, respectively).

Figure 12:
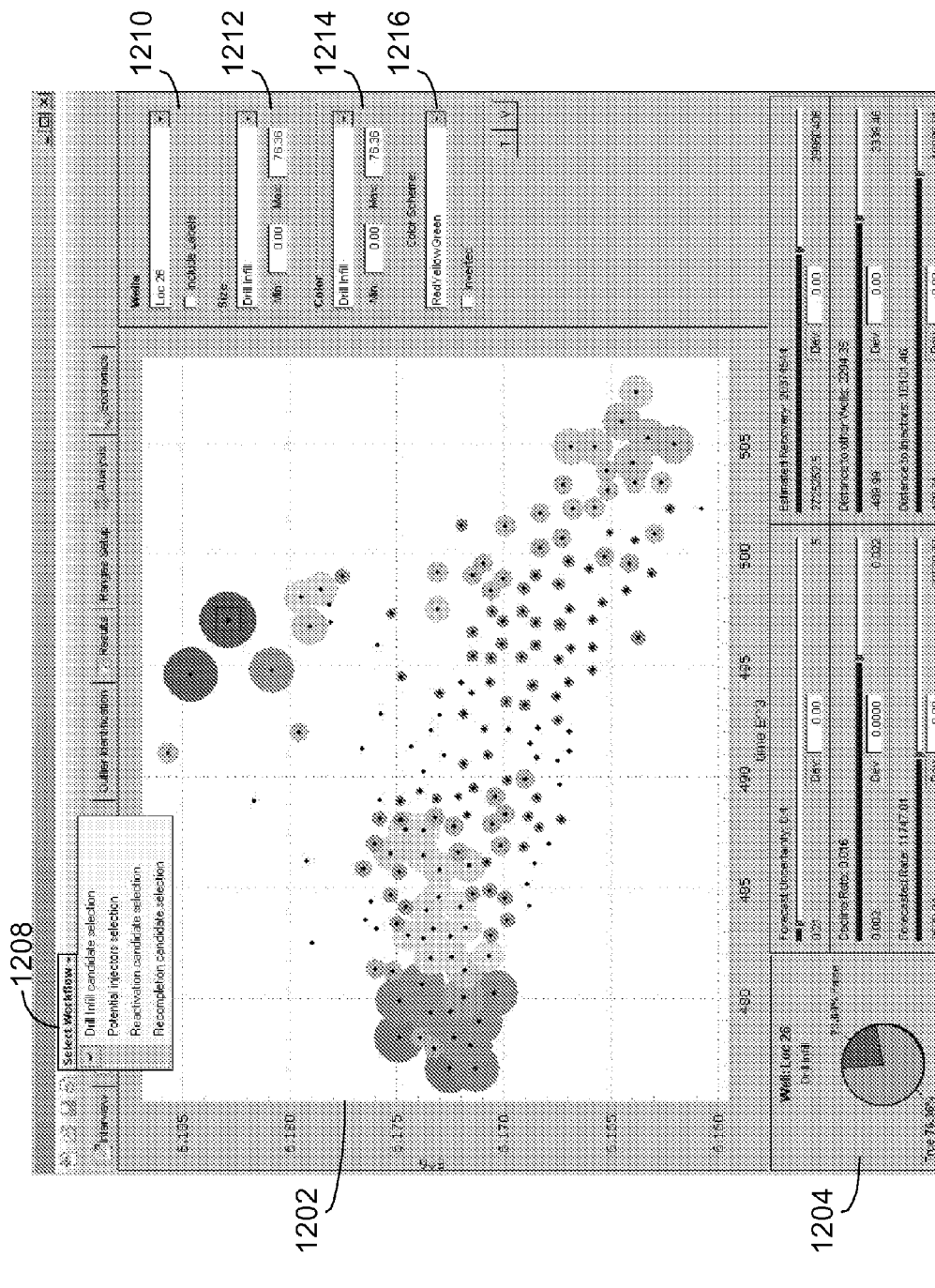
FIG. 12 illustrates an exemplary analysis screen of the workflow manager according to embodiments of the invention.

FIG. 12 illustrates an exemplary implementation of the analysis presentation screen 1200 showing the overall outcome of the workflow 600. As alluded to above, this outcome may include economic calculations involving: a) primary phase rate forecast; b) secondary phase rate forecast; c) net selling price of primary phase; d) net disposal cost of secondary phase; e) net burdens (e.g., royalty %, tax rates, etc.); f) net lifting costs (per barrel, per thousand cubic feet (mcf)); g) discount rate and net of inflation; and h) economic thresholds (e.g., payout time, net present value rate of return, etc.).

In some embodiments, the presentation screen 1200 may include, for example, chart 1202 on which the location of each well in the brownfield may be marked, with the vertical and horizontal axes of the chart 1202 representing the location coordinates of the wells according to a predetermined map. As can be seen, there are basically three clusters of wells in the present example, each of which may be selectable for display by clicking with a mouse or other pointing device. A well identification area 1204 identifies the particular well that is selected for display (e.g., well name "Loc 26" in the present example). The well identification area 1204 may also display (e.g., via a pie chart) the percent true versus the percent false of the particular well. The values of true and false represent a relative measure with which to rank one well relative to another and may be derived using the probabilistic analysis operation 662 of the workflow 600. Forecast indicators 1206 may be included that display various forecasts and related information for the particular well selected, such as a confidence forecast, a production decline rate, a forecasted rate, an estimated recovery, proximity to a producer, and proximity to an injector.

From the presentation screen 1200, the user may also select a particular portion or aspect of the workflow 600 to be viewed using a workflow selector 1208. The workflow selector 1208 allows the user to select and display various aspects such as, for example, infill candidate selection, potential injector, reactivation candidate, and recompletion candidate selection. Note that one or more forecast indicators 1206 may change based on the portion or aspect of the workflow 600 being viewed. Also present may be a well selector 1210 for selecting the particular well to be viewed, a size selector 1212 for setting the minimum and maximum size of the various wells to be displayed on the chart 1202, and a color selector 1214 for selecting the variable to control the well color on the chart 1202, as specified in color scheme selector 1216.

Figure 13A:
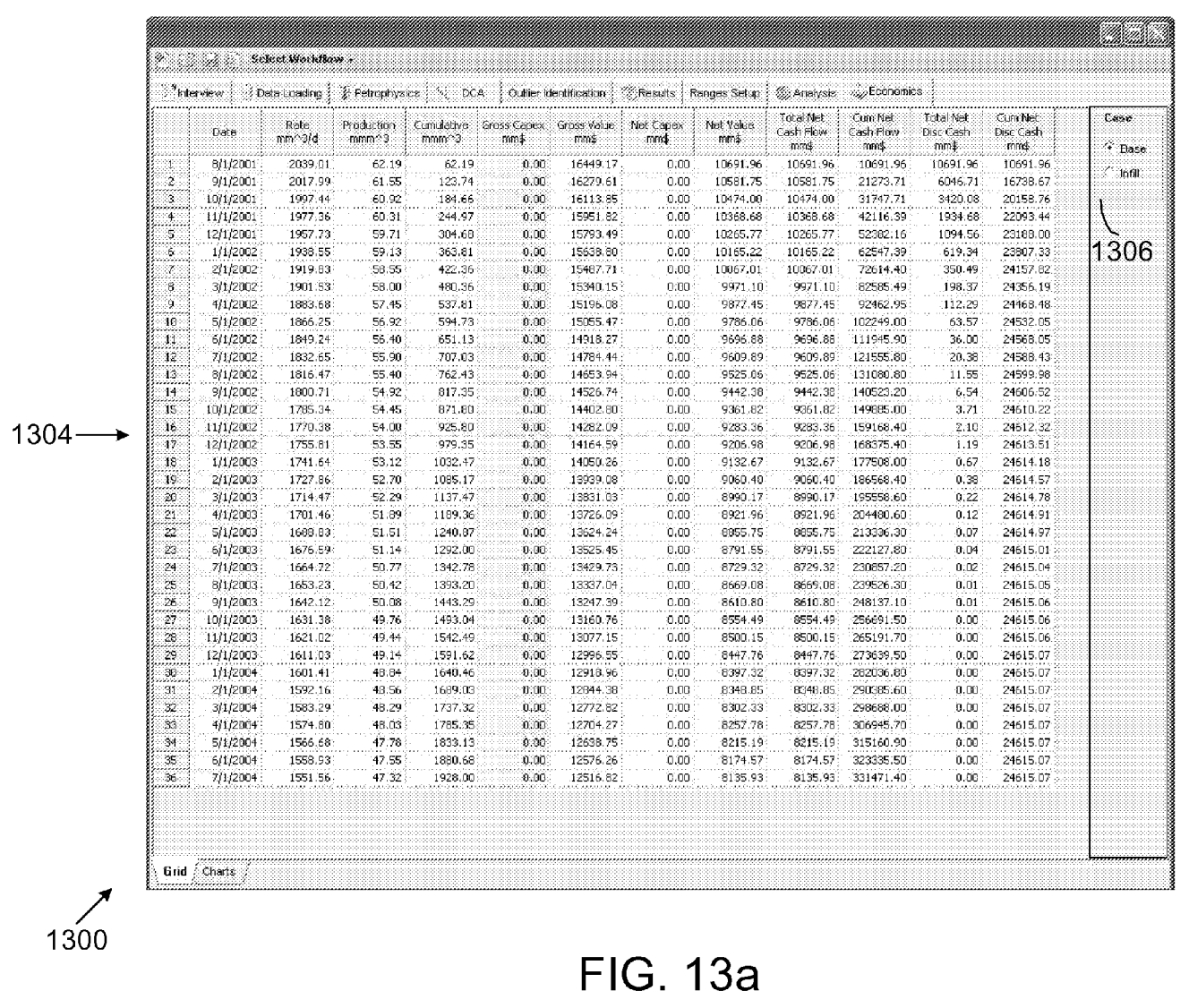
Figure 13B:
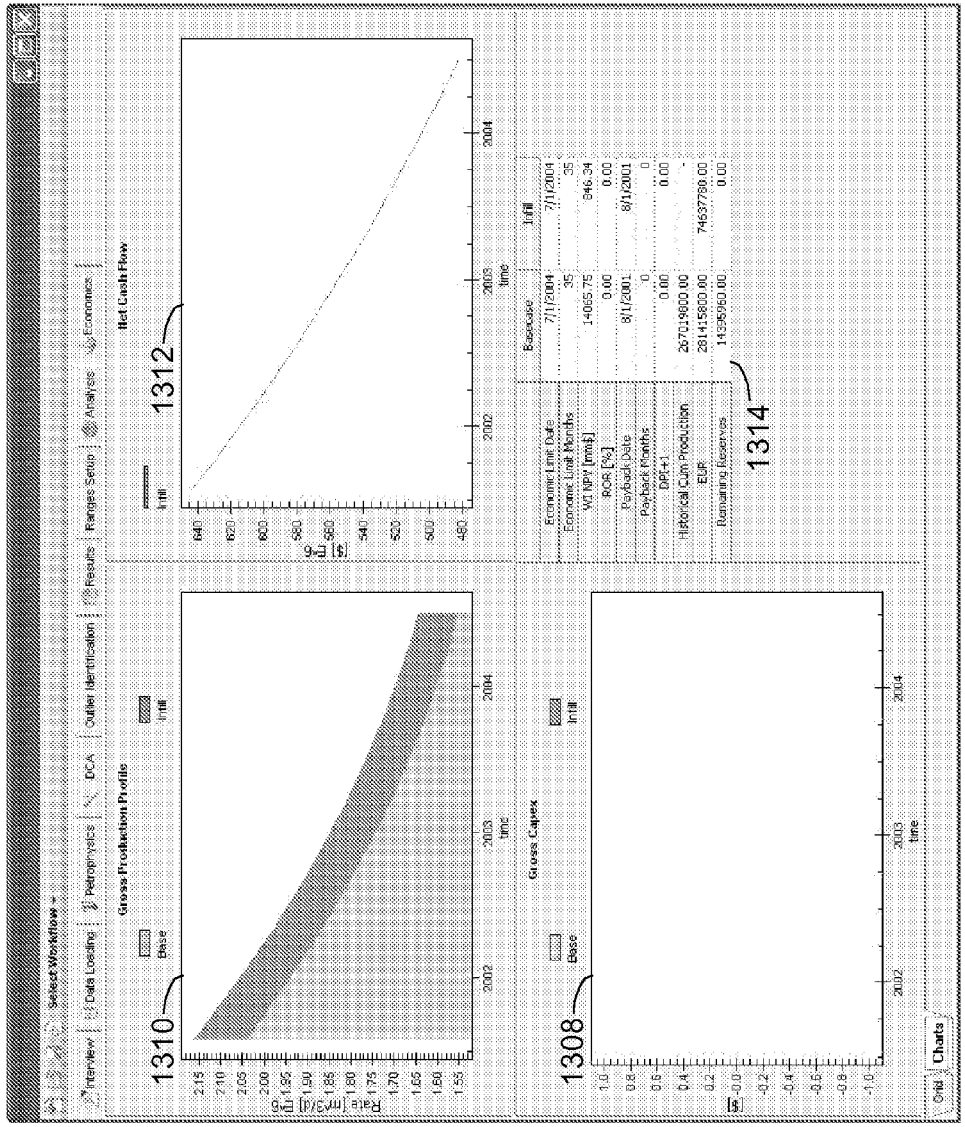

FIGS. 13a-13b illustrate an exemplary implementation of the economic presentation screens 1300 and 1302, respectively. Referring first to FIG. 13a, the presentation screen 1300 may allow the user to see the production and economics forecast in a table 1304, following application of the workflow 600, particularly the operation 668 to calculate revised individual and grouped well forecasts (see FIGS. 6a-6b). The columns of the table 1304 may include, for example, the date, rate, production, cumulative, gross capital expenditure, net capital expenditure, net value, total net cash flow, cumulative net cash flow, total net discounted cash flow, and cumulative net discounted cash flow. As emphasized above, the information contained in the columns and/or the selection of the particular columns to display, may be based on best practices and expert knowledge accumulated over time. Additionally, through radio buttons 1306, the user may view a base forecast or a forecast incorporating future developments such as infill drilling, new injection, workovers, and recompletions. These forecasts may also be seen in graphical format in FIG. 13b in the form of a gross capital expenditure chart 1308, gross production profile 1310, and a net cash flow chart 1312, as well as a summary table 1314 of key economic indicators mentioned above.

Thus far, specific implementations of the workflow manager according to preferred embodiments of the invention have been described. Following now is description of a general method, shown in FIG. 14, that may be used to implement a workflow manager according to preferred embodiments of the invention. It should be noted that while the method comprises a plurality of individual steps, two or more steps may be combined into a single step, and/or a single step may be divided into two or more constituents steps, without departing from the scope of the invention. In addition, one or more steps may be added to or removed from the method without departing from the scope of the invention. Moreover, although the steps are shown and described in a particular sequence, other sequences may certainly be used without departing from the scope of the invention.

Figure 14:
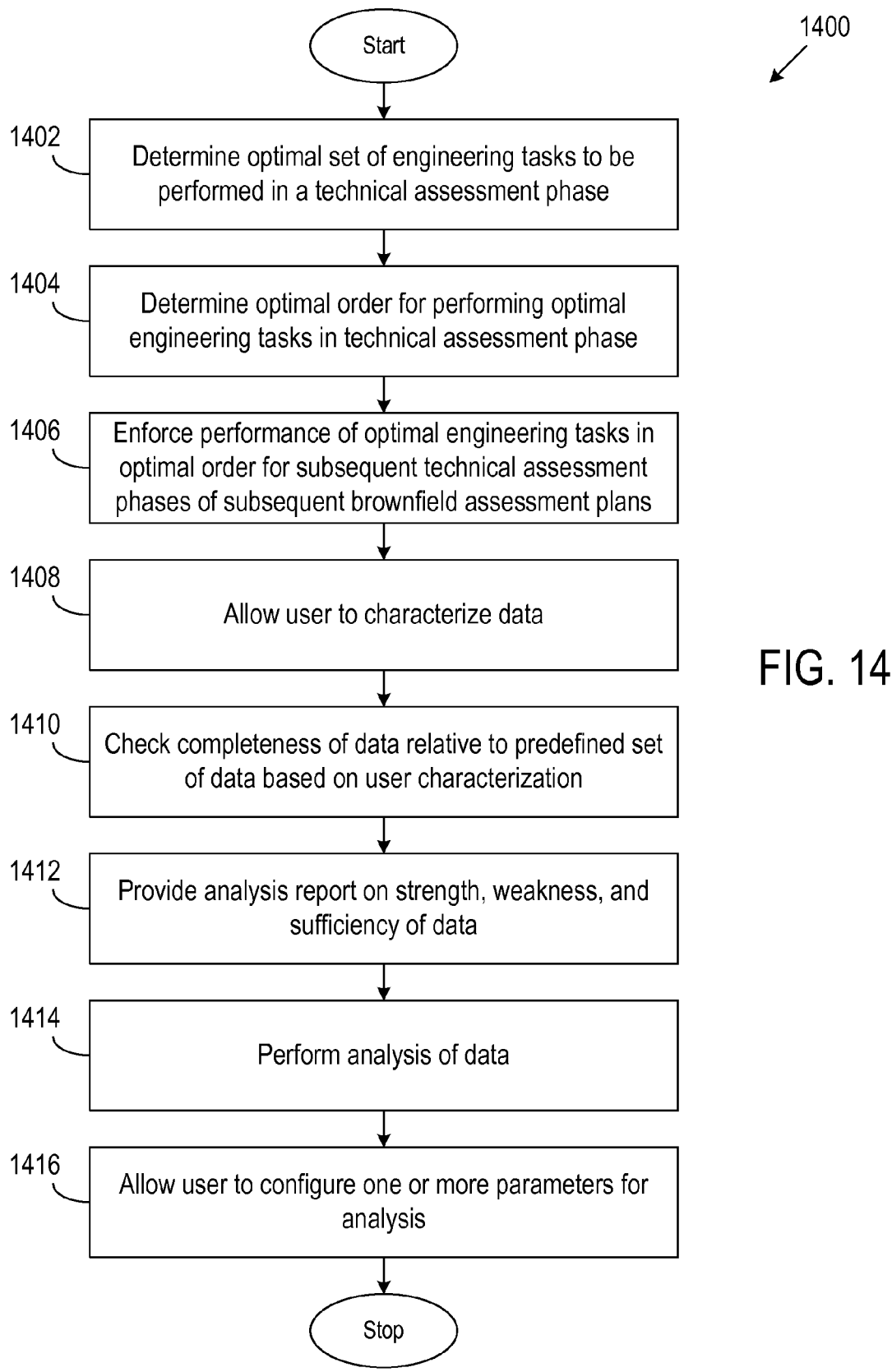
FIG. 14 illustrates an exemplary method that may be used for the workflow manager according to embodiments of the invention.

As can be seen in FIG. 14, the method begins at step 1402 where an optimal set of engineering tasks to be performed in a technical assessment phase may be determined. A similar determination may then be made to identify an optimal order for performing the optimal set of engineering tasks in the technical assessment phase at step 1404. In accordance with preferred embodiments of the invention, the optimal set of engineering tasks and the optimal order are determined based on expert knowledge and best practices identified from performance of previous brownfield assessment plans. At step 1406, performance of the optimal set of engineering tasks in the optimal order may thereafter be applied or otherwise enforced for subsequent technical assessment phases of subsequent brownfield assessment plans. Such enforcement may be effected, for example, by incorporating the engineering tasks in a particular order into the brownfield assessment workflow.

Examples of the optimal engineering tasks may include pressure modeling, reservoir data review/petrophysics, heterogeneity index/completion efficiency analysis; production and interference radius; secondary phase movement; cursory well review; recovery forecasting; vintage analysis; performance indicator identification; prediction and history matching; infill, injection, workover and reactivation candidate selection; and the like. In some embodiments, the engineering tasks to be performed are based at least on well, operations, and facilities data. In such a scenario, users may be allowed to characterize the data, as indicated in step 1408. The characterization may be based, for example, on information regarding the owner or operator, a primary phase, a secondary phase, an injected phase, reservoir layering, reservoir boundaries, reservoir pools, reservoir drive index, enhanced oil recovery, reservoir complexity, operating strategy, and the like. The completeness of the data relative to a predefined set of data may then be checked based on the user characterization at step 1410. Thereafter, at step 1412, an analysis report may be provided on the strength, weakness, and sufficiency of the data.

At step 1414, an analysis of the data may be performed. In some embodiments, the analysis may be based on well information, historical well data, geological well data, and the like. In preferred embodiments, such an analysis may include generating infill, injection, workover and reactivation candidates and production forecasts, and probabilistic analysis may be applied for ranking the candidates. Such an analysis may also include interpolating the infill candidates on maps. Finally, the user may be allowed to configure one or more parameters for the analysis at step 1460, including parameters for confidence forecast, estimated recovery, production decline rate, proximity producer, forecasted production rate, and proximity injector.

While the present invention has been described with reference to one or more particular embodiments, those skilled in the art will recognize that many changes may be made thereto without departing from the spirit and scope of the invention. Therefore, each of the foregoing embodiments and obvious variations thereof is contemplated as falling within the spirit and scope of the claimed invention, which is set forth in the following claims.

What is claimed is:

1. A computer-based method for conducting a technical assessment phase of a brownfield assessment plan, comprising:

determining an optimal set of engineering tasks to be performed in said technical assessment phase, wherein said engineering tasks to be performed are based at least on well, operations, and facilities data;

performing an analysis of said well, operations, and facilities data, said analysis based on one or more of the following: well information, historical well data, and geological well data, wherein said analysis includes generating infill, injection, workover and reactivation candidates, and one or more production forecasts;

determining an optimal order for performing said optimal set of engineering tasks in said technical assessment phase; and enforcing performance of said optimal set of engineering tasks in said optimal order for subsequent technical assessment phases of subsequent brownfield assessment plans;

wherein said optimal set of engineering tasks and said optimal order are determined based on expert knowledge and best practices identified from performance of previous brownfield assessment plans.

2. The method according to claim 1, wherein said optimal set of engineering tasks comprises pressure modeling, reservoir data petrophysics, heterogeneity index efficiency analysis, production and interference radius, secondary phase movement, cursory well review, recovery forecasting, vintage analysis, performance indicator identification, prediction and history matching, infill, injection, workover and reactivation candidate selection, and infill, injection, workover and reactivation economic analysis.

3. The method according to claim 1, further comprising allowing a user to characterize said well, operations, and facilities data.

4. The method according to claim 3, wherein said user may characterize said data based on information regarding one or more of the following: owner or operator, primary phase, secondary phase, injected phase, reservoir layering, reservoir boundaries, reservoir pools, reservoir drive index, enhanced oil recovery, reservoir complexity, and operating strategy.

5. The method according to claim 3, further comprising checking the completeness of said data relative to a predefined set of data based on said user characterization.

6. The method according to claim 3, further comprising providing an analysis report on the strength, weakness, and sufficiency of said data.

7. The method according to claim 1, further comprising applying a probabilistic analysis for ranking said candidates.

8. The method according to claim 1, wherein said analysis includes interpolating said infill candidates on maps.

9. The method according to claim 1, further comprising allowing a user to configure one or more parameters for said analysis, said parameters including parameters for confidence forecast, estimated recovery, production decline rate, proximity producer, forecasted production rate, and proximity injector.

10. A computer-based system for conducting a technical assessment phase of a brownfield assessment plan, comprising:

a processor; a system bus connected to said processor; a storage medium connected to said system bus, said storage medium having computer-readable instructions stored thereon for causing said processor to:

define an optimal set of engineering tasks to be performed in said technical assessment phase, wherein said engineering tasks to be performed are based at least on well, operations, and facilities data;

perform an analysis of said data said analysis based on one or more of the following: well information, historical well data, and geological well data, wherein said analysis includes generating infill, injection, workover and reactivation candidates, and one or more production forecasts;

define an optimal order for performing said optimal set of engineering tasks in said technical assessment phase; and enforce performance of said optimal set of engineering tasks in said optimal order for subsequent technical assessment phases of subsequent brownfield assessment plans;

wherein said optimal set of engineering tasks and said optimal order are determined based on expert knowledge and best practices identified from performance of previous brownfield assessment plans.

11. The system according to claim 10, wherein said optimal set of engineering tasks comprises pressure modeling, reservoir data petrophysics, heterogeneity index efficiency analysis, production and interference radius, secondary phase movement, cursory well review, recovery forecasting, vintage analysis, performance indicator identification, prediction and history matching, infill, injection, workover and reactivation candidate selection, and infill, injection, workover and reactivation economic analysis.

12. The system according to claim 10, said computer-readable instructions further causing said processor to allow a user to characterize said data.

13. The system according to claim 12, wherein said processor allows said user to characterize said data based on information regarding one or more of the following: owner or operator, primary phase, secondary phase, injected phase, reservoir layering, reservoir boundaries, reservoir pools, reservoir drive mechanism, enhanced oil recovery, reservoir complexity, and operating strategy.

14. The system according to claim 12, wherein said computer-readable instructions further cause said processor to check a completeness of said data relative to a predefined set of data based on said user characterization.

15. The system according to claim 12, wherein said computer-readable instructions further cause said processor to provide an analysis report on the strength, weakness, and sufficiency of said data.

16. The system according to claim 10, wherein said computer-readable instructions further cause said processor to apply probabilistic analysis for ranking said candidates.

17. The system according to claim 10, wherein said computer-readable instructions further cause said processor to interpolate said infill candidates on maps.

18. The system according to claim 10, wherein said computer-readable instructions further cause said processor to allow a user to configure one or more parameters for said analysis, said parameters including parameters for confidence forecast, estimated recovery, production decline rate, proximity producer, forecasted production rate, and proximity injector.

19. A computer-readable storage medium for conducting a technical assessment phase of a brownfield assessment plan comprising instructions which, when executed, cause a computing device to:

define an optimal set of engineering tasks to be performed in said technical assessment phase;

define an optimal order for performing said optimal set of engineering tasks in said technical assessment phase; and enforce performance of said optimal set of engineering tasks in said optimal order for subsequent technical assessment phases of subsequent brownfield assessment plans;

wherein said optimal set of engineering tasks comprises pressure modeling, reservoir data petrophysics, and heterogeneity index efficiency analysis.

20. The computer-readable medium of claim 19, wherein said optimal set of engineering tasks further comprises production and interference radius, secondary phase movement, cursory well review, recovery forecasting, and vintage analysis.

21. The computer-readable medium of claim 20, wherein said optimal set of engineering tasks further comprises performance indicator identification, prediction and history matching, infill, injection, workover and reactivation candidate selection, and infill, injection, workover and reactivation economic analysis.

* * * * *